US012431070B2

(12) United States Patent
Du

(10) Patent No.: US 12,431,070 B2
(45) Date of Patent: Sep. 30, 2025

(54) PIXEL DRIVING CIRCUIT AND DISPLAY PANEL

(71) Applicant: HEFEI VISIONOX TECHNOLOGY CO., LTD., Anhui (CN)

(72) Inventor: Yongqiang Du, Hefei (CN)

(73) Assignee: Hefei Visionox Technology Co., Ltd., Hefei (CN)

( * ) Notice: Subject to any disclaimer, the term of this patent is extended or adjusted under 35 U.S.C. 154(b) by 0 days.

(21) Appl. No.: 18/648,766

(22) Filed: Apr. 29, 2024

(65) Prior Publication Data

US 2025/0006113 A1 Jan. 2, 2025

Related U.S. Application Data

(63) Continuation of application No. PCT/CN2024/078342, filed on Feb. 23, 2024.

(30) Foreign Application Priority Data

Jun. 29, 2023 (CN) ........................ 202310798701.3
Dec. 4, 2023 (CN) ........................ 202311686416.9

(51) Int. Cl.
*G09G 3/32* (2016.01)

(52) U.S. Cl.
CPC ....... *G09G 3/32* (2013.01); *G09G 2300/0426* (2013.01); *G09G 2320/0233* (2013.01);
(Continued)

(58) Field of Classification Search
CPC ...... G09G 3/32–3291; G09G 2300/0421–043; G09G 2300/0819;
(Continued)

(56) References Cited

U.S. PATENT DOCUMENTS 9,269,301 B2 * 2/2016 Lee ...................... G09G 3/3258
2014/0118409 A1 * 5/2014 Jun ...................... G09G 3/3233
345/690
(Continued)

FOREIGN PATENT DOCUMENTS

CN 104252836 A 12/2014
CN 106097964 A 11/2016
(Continued)

OTHER PUBLICATIONS

Search Report issued on Jun. 5, 2024, in corresponding International Application No. PCT/CN2024/078342, 8 pages.

*Primary Examiner* — Nathan Danielsen
(74) *Attorney, Agent, or Firm* — Maier & Maier, PLLC

(57) ABSTRACT

A pixel driving circuit and a display panel. The pixel driving circuit includes at least one first pixel driving unit and at least one second pixel driving unit. The first pixel driving unit includes a first drive transistor and a first light-emitting element, and the first drive transistor has a first threshold adjustment gate configured to receive a first adjustment signal. The second pixel driving unit includes a second drive transistor and a second light-emitting element, and the second drive transistor has a second threshold adjustment gate configured to receive a second adjustment signal. The first light-emitting element and the second light-emitting element have different light emitting colors, and when the first light-emitting element and the second light-emitting element 10 perform at a target grayscale, the first adjustment signal and the second adjustment signal have different voltage values.

22 Claims, 13 Drawing Sheets

(52) U.S. Cl.
CPC ............... *G09G 2320/0271* (2013.01); *G09G 2330/021* (2013.01)

(58) Field of Classification Search
CPC ... G09G 2300/0861; G09G 2310/0243; G09G 2310/06; G09G 2310/08; G09G 2330/021; G09G 2330/022
See application file for complete search history.

(56) References Cited

U.S. PATENT DOCUMENTS

| | | | | |
|---|---|---|---|---|
| 2016/0063922 | A1 | 3/2016 | Tsai et al. | |
| 2022/0293876 | A1* | 9/2022 | Bibl | H01L 24/97 |
| 2023/0119632 | A1* | 4/2023 | Kwon | G09G 3/3233 345/690 |
| 2023/0282681 | A1* | 9/2023 | Kim | H01L 25/0753 |

FOREIGN PATENT DOCUMENTS

| | | | |
|---|---|---|---|
| CN | 109767730 | A | 5/2019 |
| CN | 111128079 | A | 5/2020 |
| CN | 112531002 | A | 3/2021 |
| CN | 112863429 | A | 5/2021 |
| CN | 215933606 | U | 3/2022 |
| CN | 114765007 | A | 7/2022 |
| CN | 114824128 | A | 7/2022 |
| CN | 115188321 | A | 10/2022 |
| EP | 3367374 | A1 | 8/2018 |
| TW | 202125770 | A | 7/2021 |

* cited by examiner

PIXEL DRIVING CIRCUIT AND DISPLAY PANEL

CROSS-REFERENCE TO RELATED APPLICATIONS

This is a continuation of International Patent Application No. PCT/CN2024/078342, filed Feb. 23, 2024, which claims priority to Chinese Patent Application No. 202310798701.3 filed with the China National Intellectual Property Administration (CNIPA) on Jun. 29, 2023 and Chinese Patent Application No. 202311686416.9 filed with the CNIPA on Dec. 4, 2023, the disclosures of which are incorporated herein by reference in their entireties.

TECHNICAL FIELD

The present application relates to the field of display technology, for example, a pixel driving circuit and a display panel.

BACKGROUND

With the continuous development of display technology, increasingly high requirements are imposed on display panels, and the performance of the display panels is to be improved.

SUMMARY

The present application provides a pixel driving circuit and a display panel to improve the performance of a display panel.

The present application provides a pixel driving circuit. The pixel driving circuit includes at least one first pixel driving unit and at least one second pixel driving unit.

A first pixel driving unit includes a first drive transistor and a first light-emitting element, the first drive transistor has a first drive current control gate and a first threshold adjustment gate, the first drive current control gate is configured to receive a first data signal, the first threshold adjustment gate is configured to receive a first adjustment signal, and the first drive transistor is configured to drive the first light-emitting element under the control of the first data signal and the first adjustment signal.

A second pixel driving unit includes a second drive transistor and a second light-emitting element, the second drive transistor has a second drive current control gate and a second threshold adjustment gate, the second drive current control gate is configured to receive a second data signal, the second threshold adjustment gate is configured to receive a second adjustment signal, and the second drive transistor is configured to drive the second light-emitting element under the control of the second data signal and the second adjustment signal.

The first light-emitting element and the second light-emitting element have different light emitting colors, and in the case where the first light-emitting element and the second light-emitting element perform at a target grayscale, the first adjustment signal and the second adjustment signal have different voltage values.

The present application further provides a display panel including the pixel driving circuit according to the preceding embodiment, a first metal layer, a light-emitting function layer, and an isolation layer.

The first threshold adjustment gate and the second threshold adjustment gate are electrically isolated from each other and are disposed in the first metal layer.

The light-emitting function layer is disposed on a side of the first metal layer, and part of the at least one first light-emitting element and part of the at least one second light-emitting element are disposed in the light-emitting function layer.

The isolation layer is disposed on a side of the first metal layer and configured to isolate the first light-emitting element from the second light-emitting element, and the isolation layer includes at least one first gate isolation column and at least one second gate isolation column.

The at least one first gate isolation column is coupled to the first threshold adjustment gate, the first adjustment signal is exerted to the at least one first gate isolation column, and the at least one second gate isolation column is coupled to the second threshold adjustment gate, and the second adjustment signal is exerted to the at least one second gate isolation column.

The present application further provides a display panel including a substrate, a driver circuit layer, and an isolation layer.

The substrate has a first side.

The driver circuit layer is disposed on the first side and includes a first drive transistor in a first pixel driving unit, and the first drive transistor has a first threshold adjustment gate.

The isolation layer is disposed on a side of the driver circuit layer away from the substrate and includes a first gate isolation column, the first gate isolation column is coupled to the first threshold adjustment gate, and a first adjustment signal is exerted to the first gate isolation column.

The present application further provides a display device including the display panel according to any one of the preceding embodiments.

In the embodiments of the present application, it is set that a drive transistor in a pixel driving unit includes a threshold adjustment gate, and it is set that a voltage of the threshold adjustment gate of the drive transistor can be adjusted, thereby adjusting a threshold voltage of the drive transistor and improving the performance of the display panel.

DETAILED DESCRIPTION

Terms such as "first" and "second" in the description, claims, and above drawings of the present application are used to distinguish between similar objects and are not necessarily used to describe a particular order or sequence. It is to be understood that data used in this manner are interchangeable where appropriate so that the embodiments of the present application described herein may also be implemented in a sequence not illustrated or described herein. Additionally, terms "including", "having", and any variations thereof are intended to encompass a non-exclusive inclusion. For example, in addition to a process, method, system, product, or device that includes a series of steps or units and that is shown in embodiments of the present application, other processes, methods, systems, products, or devices that include the series of steps or units and that are not expressly listed, or other steps or units that are inherent to such processes, methods, systems, products, or devices, may also be included.

A display panel is composed of pixel driving units of different colors. Different materials of light-emitting elements in the pixel driving units cause different pixel efficiency, and thus different pixel driving units require different black state voltages. The adjustment of a threshold voltage of a drive transistor in a pixel driving unit helps to alleviate this issue. To meet a display requirement, in some embodiments, a driver chip needs to set the highest data signal (VGMP) outputted by the driver chip to meet the highest black state voltage among sub-pixels of different colors, while this voltage output range is redundant for other pixel driving units. A high black state voltage increases the power consumption of the driver chip. Therefore, in some embodiments, the display panel has relatively large power consumption and a relatively low utilization rate of a voltage range of a data signal.

Figure 1:
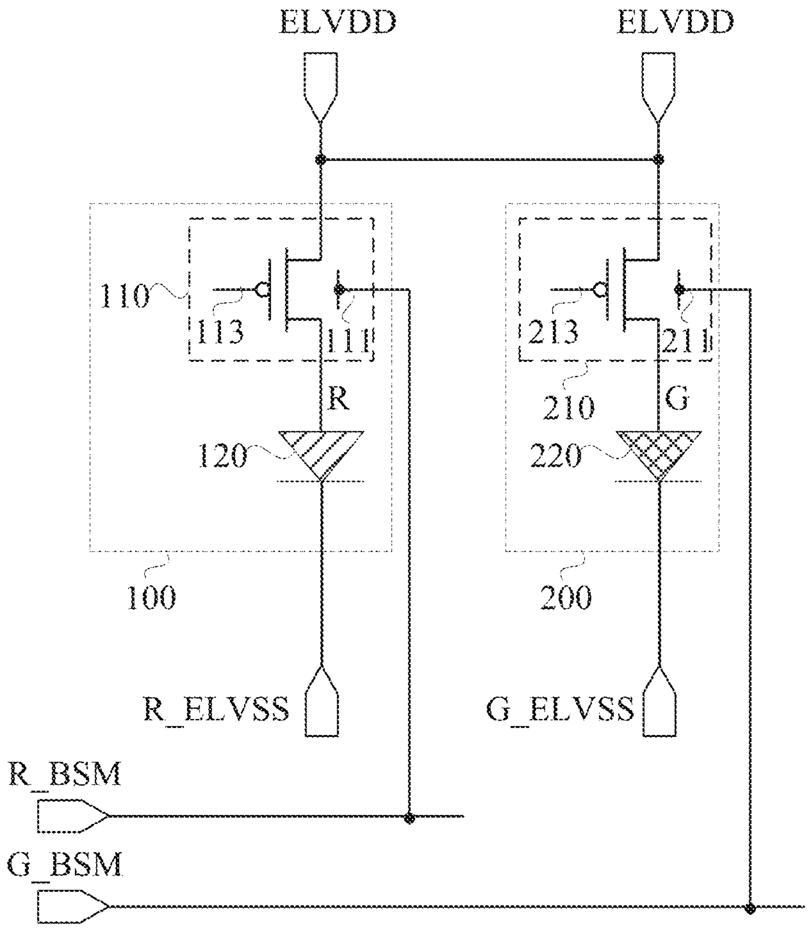
FIG. 1 is a circuit diagram of a pixel driving circuit according to an embodiment of the present application.

FIG. 1 is a circuit diagram of a pixel driving circuit according to an embodiment of the present application. Referring to FIG. 1, the pixel driving circuit includes at least one first pixel driving unit 100 and at least one second pixel driving unit 200.

The first pixel driving unit 100 includes a first drive transistor 110 and a first light-emitting element 120, the first drive transistor 110 has a first drive current control gate 113 and a first threshold adjustment gate 111, the first drive current control gate 113 is configured to receive a first data signal, the first threshold adjustment gate 111 is configured to receive a first adjustment signal R_BSM, and the first drive transistor 110 drives the first light-emitting element 120 under the control of the first data signal and the first adjustment signal R_BSM.

The second pixel driving unit 200 includes a second drive transistor 210 and a second light-emitting element 220, the second drive transistor 210 has a second drive current control gate 213 and a second threshold adjustment gate 211, the second drive current control gate 213 is configured to receive a second data signal, the second threshold adjustment gate 211 is configured to receive a second adjustment signal G_BSM, and the second drive transistor 210 drives the second light-emitting element 220 under the control of the second data signal and the second adjustment signal G_BSM.

The first light-emitting element 120 and the second light-emitting element 220 have different light emitting colors, and when the first light-emitting element 120 and the second light-emitting element 220 perform at a target grayscale, the first adjustment signal R_BSM and the second adjustment signal G_BSM have different voltage values.

For example, a driving principle of the pixel driving circuit is described by using the first pixel driving unit 100 as an example. A source electrode of the first drive transistor 110 accesses a voltage ELVDD, and a drain electrode of the first drive transistor 110 is electrically connected to the first light-emitting element 120. The first data signal is written into the first drive current control gate 113 of the first drive transistor 110, and a magnitude of the first data signal determines a magnitude of a drive current generated by the first drive transistor 110. For example, the first drive transistor 110 is a p-type transistor. When a voltage of the first data signal is a negative value, the larger an absolute value of the voltage of the first data signal, the larger the drive current generated by the first drive transistor 110, and the higher brightness the first light-emitting element 120 has; when the voltage of the first data signal is a positive value, the larger the absolute value of the voltage of the first data signal, the smaller the drive current generated by the first drive transistor 110, and the lower brightness the first light-emitting element 120 has.

A range of the first data signal written into the first drive transistor 110 and the magnitude of the drive current generated by the first drive transistor 110 are also related to a threshold voltage of the first drive transistor 110. The first drive transistor 110 according to the embodiment of the present application further includes the first threshold adjustment gate 111, and the first threshold adjustment gate 111 can adjust a magnitude of the threshold voltage of the first drive transistor 110. In practical application, a voltage value is provided for the first threshold adjustment gate 111 of the first drive transistor 110 so that the threshold voltage of the first drive transistor 110 can reach an ideal state. For example, if a positive bias of the threshold voltage of the first drive transistor 110 is required, a voltage value for causing the positive bias of the threshold voltage is provided for the first threshold adjustment gate 111. In some other embodiments, if a negative bias of the threshold voltage of the first drive transistor 110 is required, a voltage value for causing the negative bias of the threshold voltage is provided for the first threshold adjustment gate 111.

In the embodiments of the present application, the target grayscale refers to a grayscale corresponding to a light-emitting element in a static state (which may also be referred to as a "standby state"). Correspondingly, a voltage configured for the drive current control gate of the light-emitting element in the static state may be referred to as "black state voltage". In an embodiment, the target grayscale may be configured to be a grayscale with a gray scale value of 0, and the first light-emitting element 120 and the second light-emitting element 220 emit no light at the grayscale with a gray scale value of 0. In an embodiment, the target grayscale may be configured to be another grayscale (such as a grayscale with a gray scale value of 1 or a grayscale with a gray scale value of 2).

For example, the first light-emitting element 120 is a red light-emitting element R, and the second light-emitting element 220 is a green light-emitting element G. The first drive transistor 110 and the second drive transistor 210 are each the p-type transistor. A threshold voltage of the p-type transistor is a negative value. With the first pixel driving unit 100 as an example, the lower the voltage (that is, a first data voltage corresponding to the first data signal) written into the first drive current control gate 113, the larger the generated drive current; the higher the voltage written into the first drive current control gate 113, the smaller the generated drive current.

Due to a performance difference between light-emitting materials of light-emitting elements of different colors, pixel driving units of two different colors have different efficiency, and thus the pixel driving units of two different colors require different black state voltages. In the embodiment of the present application, a result of tests on a kind of products indicates that with the target grayscale configured to be the grayscale with the gray scale value of 0, for example, a black state voltage of 6.6 V needs to be written into the first drive current control gate 113 of the first drive transistor 110 in the first pixel driving unit 100, and the second pixel driving unit 200 requires a black state voltage of 6.8 V. To implement the black state display of a display panel, a driver chip needs to meet the highest voltage requirement. Therefore, for the highest data signal outputted by the driver chip, refer to the black state voltage (6.8 V) for the second pixel driving unit 200. However, such a high voltage output range is redundant for the first light-emitting element 120, causing an increase in the power consumption of the driver chip.

In the embodiment of the present application, a voltage of a threshold adjustment gate is adjusted so that the black state voltage for a pixel driving unit can be adjusted. For example, a voltage of the second adjustment signal G_BSM is adjusted so that the threshold voltage of the second drive transistor 210 is positively biased, and the black state voltage for the second pixel driving unit 200 can be reduced. The reason is described below. In a data writing process of a drive transistor, when the threshold voltage of the drive transistor is a negative value, the larger the absolute value of the threshold voltage, the slower data is written; when the threshold voltage of the drive transistor is a positive value, the larger the absolute value of the threshold voltage, the faster data is written. In the embodiments of the present application, the voltage of the second adjustment signal G_BSM is adjusted to be different from a voltage of the first adjustment signal R_BSM so that the threshold voltage of the second drive transistor 210 can be positively biased, thereby accelerating the writing of the second data signal and making it convenient to implement the black state display of the second light-emitting element 220 by using a smaller black state voltage. Thus, the embodiments of the present application can make the black state voltages for the first pixel driving unit 100 and the second pixel driving unit 200 tend to be consistent, facilitating a decrease in a voltage range of a data signal outputted by the driver chip, improving a utilization rate of the voltage range of the data signal, and reducing the power consumption of the display panel.

In FIG. 1, for example, the first light-emitting element 120 is the red light-emitting element R and the second light-emitting element 220 is the green light-emitting element G, which is used as an example and not to limit the present application. In other embodiments, the first light-emitting element 120 and the second light-emitting element 220 may be configured to be the red light-emitting element R and a blue light-emitting element B, respectively; or the first light-emitting element 120 and the second light-emitting element 220 are configured to be the green light-emitting element G and a blue light-emitting element B, respectively.

Figure 2:
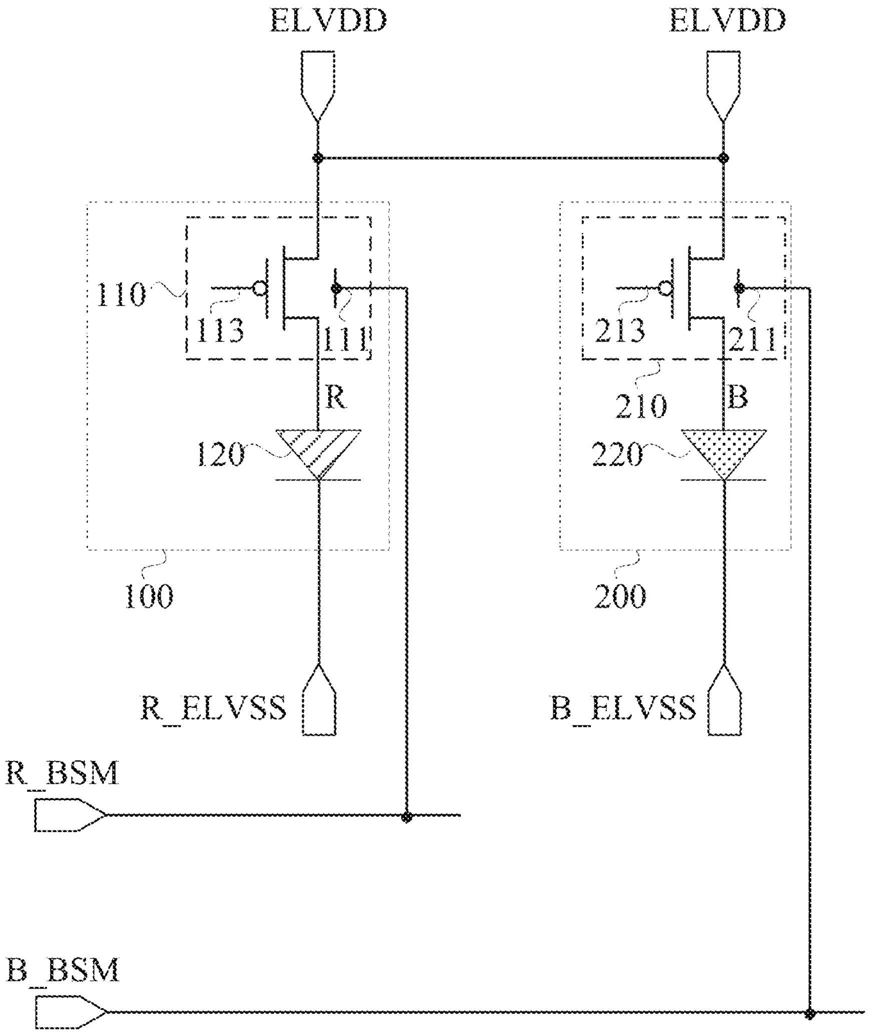
FIG. 2 is another circuit diagram of a pixel driving circuit according to an embodiment of the present application.

FIG. 2 is another circuit diagram of a pixel driving circuit according to an embodiment of the present application. Referring to FIG. 2, in another embodiment of the present application, the first light-emitting element 120 is the red light-emitting element R, and the second light-emitting element 220 is the blue light-emitting element B.

For example, the first drive transistor 110 and the second drive transistor 210 are each the p-type transistor. In the embodiment of the present application, the result of the tests on the kind of products indicates that with the target grayscale configured to be the grayscale with the gray scale value of 0, for example, the black state voltage of 6.6 V needs to be written into the first drive current control gate 113 of the first drive transistor 110 in the first pixel driving unit 100, and the second pixel driving unit 200 requires a black state voltage of 6.4 V. To implement the black state display of the display panel, the driver chip needs to meet the highest voltage requirement. Therefore, for the highest data signal outputted by the driver chip, refer to the black state voltage (6.6 V) for the first pixel driving unit 100. However, such a high voltage output range is redundant for the second light-emitting element 220, causing an increase in the power consumption of the driver chip.

In the embodiment of the present application, the voltage of the threshold adjustment gate is adjusted so that the black state voltage for the pixel driving unit can be adjusted. For example, the voltage of the first adjustment signal R_BSM is adjusted so that the threshold voltage of the first drive transistor 110 is positively biased, and the black state voltage for the first pixel driving unit 100 can be reduced. Thus, the black state voltages for the first pixel driving unit 100 and the second pixel driving unit 200 can tend to be consistent, facilitating the decrease in the voltage range of the data signal outputted by the driver chip, improving the utilization rate of the voltage range of the data signal, and reducing the power consumption of the display panel.

Figure 3:
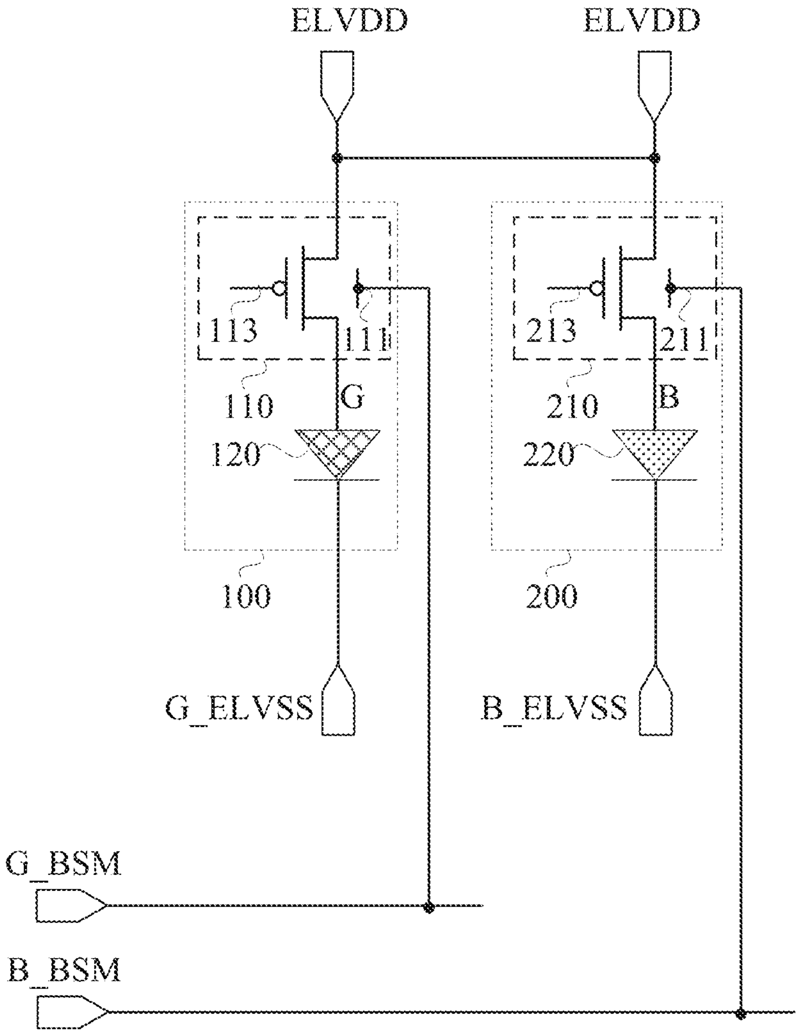
FIG. 3 is another circuit diagram of a pixel driving circuit according to an embodiment of the present application.

FIG. 3 is another circuit diagram of a pixel driving circuit according to an embodiment of the present application. Referring to FIG. 3, in another embodiment of the present application, the first light-emitting element 120 is the green light-emitting element G, and the second light-emitting element 220 is the blue light-emitting element B.

For example, the first drive transistor 110 and the second drive transistor 210 are each the p-type transistor. In the embodiment of the present application, the result of the tests on the kind of products indicates that with the target grayscale configured to be the grayscale with the gray scale value of 0, for example, a black state voltage of 6.8 V needs to be written into the first drive current control gate 113 of the first drive transistor 110 in the first pixel driving unit 100, and the second pixel driving unit 200 requires the black state voltage of 6.4 V. To implement the black state display of the display panel, the driver chip needs to meet the highest voltage requirement. Therefore, for the highest data signal outputted by the driver chip, refer to the black state voltage (6.8 V) for the first pixel driving unit 100. However, such a high voltage output range is redundant for the second light-emitting element 220, causing an increase in the power consumption of the driver chip.

In the embodiment of the present application, the voltage of the threshold adjustment gate is adjusted so that the black state voltage for the pixel driving unit can be adjusted. For example, the voltage of the first adjustment signal G_BSM is adjusted so that the threshold voltage of the first drive transistor 110 is positively biased, and the black state voltage for the first pixel driving unit 100 can be reduced. Thus, the black state voltages for the first pixel driving unit 100 and the second pixel driving unit 200 can tend to be consistent, facilitating the decrease in the voltage range of the data signal outputted by the driver chip, improving the utilization rate of the voltage range of the data signal, and reducing the power consumption of the display panel.

It can be seen that in the embodiment of the present application, it is set that the first drive transistor 110 in the first pixel driving unit 100 includes the first threshold adjustment gate 111 and the second drive transistor 210 in the second pixel driving unit 200 includes the second threshold adjustment gate 211, and it is set that a voltage of the first threshold adjustment gate 111 of the first drive transistor 110 and a voltage of the second threshold adjustment gate 211 of the second drive transistor 210 can be adjusted, thereby adjusting the threshold voltage of the first drive transistor 110 and the threshold voltage of the second drive transistor 210 to improve the performance of the display panel.

Figure 4:
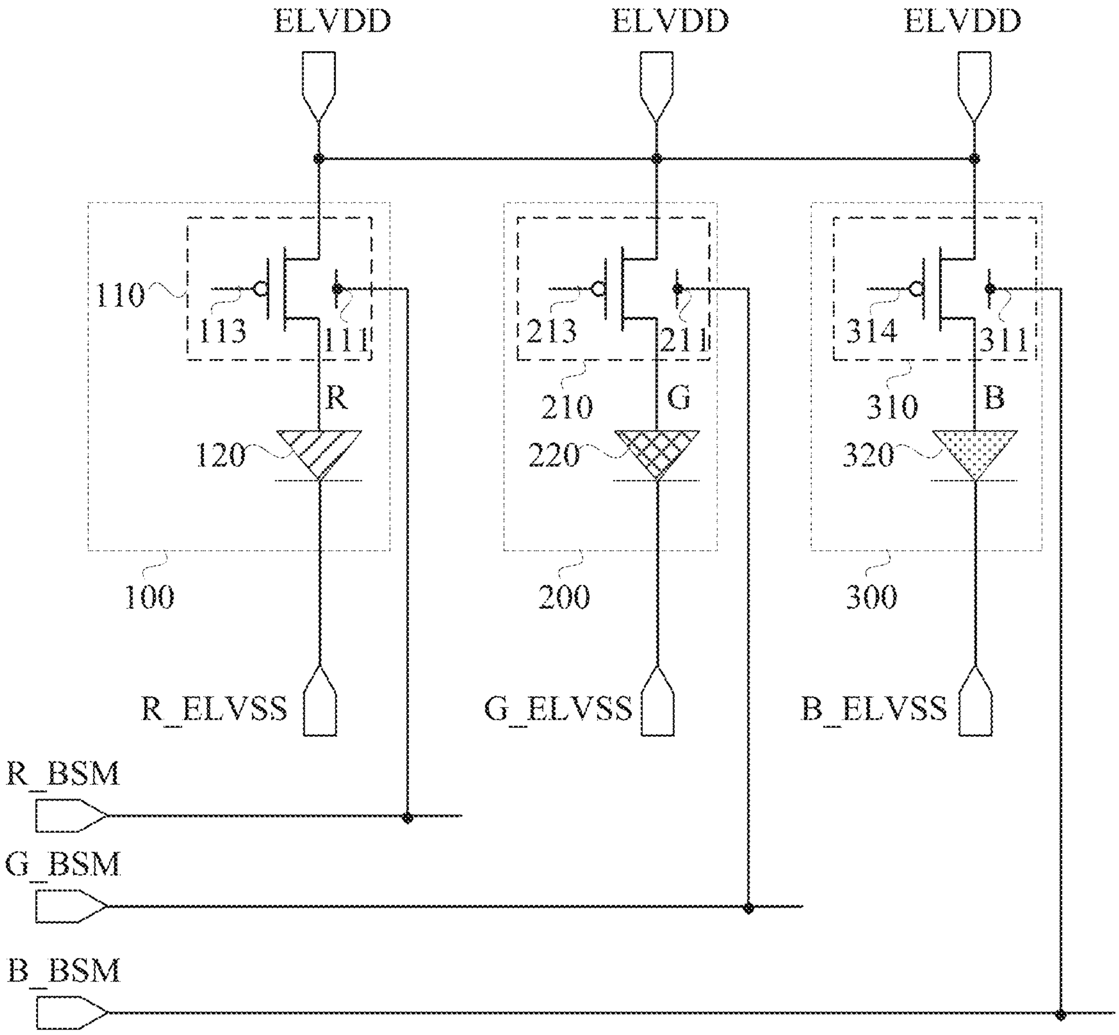
FIG. 4 is another circuit diagram of a pixel driving circuit according to an embodiment of the present application.

FIG. 4 is another circuit diagram of a pixel driving circuit according to an embodiment of the present application. Referring to FIG. 4, the pixel driving circuit may further include at least one third pixel driving unit 300, the third pixel driving unit 300 includes a third drive transistor 310 and a third light-emitting element 320, the third drive transistor 310 has a third drive current control gate 314 and a third threshold adjustment gate 311, the third drive current control gate 314 is configured to receive a third data signal, the third threshold adjustment gate 311 is configured to receive a third adjustment signal B_BSM, and the third drive transistor 310 drives the third light-emitting element 320 under the control of the third data signal and the third adjustment signal B_BSM.

The first light-emitting element 120, the second light-emitting element 220, and the third light-emitting element 320 have different light emitting colors, and when the first light-emitting element 120, the second light-emitting element 220, and the third light-emitting element 320 perform at the target grayscale, at least two of the first adjustment signal R_BSM, the second adjustment signal G_BSM, and the third adjustment signal B_BSM have different voltage values. For example, the first adjustment signal R_BSM is different from the second adjustment signal G_BSM, and the third adjustment signal B_BSM is the same as the first adjustment signal R_BSM. For another example, the first adjustment signal R_BSM is different from the second adjustment signal G_BSM, and the third adjustment signal B_BSM is the same as the second adjustment signal G_BSM. For another example, the second adjustment signal G_BSM is different from the third adjustment signal B_BSM, and the first adjustment signal R_BSM is the same as the second adjustment signal G_BSM. For another example, the second adjustment signal G_BSM is different from the third adjustment signal B_BSM, and the first adjustment signal R_BSM is the same as the third adjustment signal B_BSM. For another example, the first adjustment signal R_BSM is different from the third adjustment signal B_BSM, and the second adjustment signal G_BSM is the same as the first adjustment signal R_BSM. For another example, the first adjustment signal R_BSM is different from the third adjustment signal B_BSM, and the second adjustment signal G_BSM is the same as the third adjustment signal B_BSM. For another example, the first adjustment signal R_BSM, the second adjustment signal G_BSM, and the third adjustment signal B_BSM are different from each other.

In some embodiments, when the first light-emitting element 120, the second light-emitting element 220, and the third light-emitting element 320 perform at the target grayscale, the first data signal, the second data signal, and the third data signal have the same voltage value, and at least two of the first adjustment signal R_BSM, the second adjustment signal G_BSM, and the third adjustment signal B_BSM have different voltage values.

For example, the driving principle of the pixel driving circuit is described by using the first pixel driving unit 100 as an example. The source electrode of the first drive transistor 110 accesses the voltage ELVDD, and the drain electrode of the first drive transistor 110 is electrically connected to the first light-emitting element 120. The first data signal is written into the first drive current control gate 113 of the first drive transistor 110, and the magnitude of the first data signal determines the magnitude of the drive current generated by the first drive transistor 110. For example, the first drive transistor 110 is the p-type transistor. When the voltage of the first data signal is a negative value, the larger the absolute value of the voltage of the first data signal, the larger the drive current generated by the first drive transistor 110, and the higher brightness the first light-emitting element 120 has; when the voltage of the first data signal is a positive value, the larger the absolute value of the voltage of the first data signal, the smaller the drive current generated by the first drive transistor 110, and the lower brightness the first light-emitting element 120 has.

The range of the first data signal written into the first drive transistor 110 and the magnitude of the drive current generated by the first drive transistor 110 are also related to the threshold voltage of the first drive transistor 110. The first drive transistor 110 according to the embodiment of the present application further includes the first threshold adjustment gate 111, and the first threshold adjustment gate 111 can adjust the magnitude of the threshold voltage of the first drive transistor 110. In practical application, a voltage value is provided for the first threshold adjustment gate 111 of the first drive transistor 110 so that the threshold voltage of the first drive transistor 110 can reach an ideal state. For example, if a positive bias of the threshold voltage of the first drive transistor 110 is required, a voltage value for causing the positive bias of the threshold voltage is provided for the first threshold adjustment gate 111. In some other embodiments, if a negative bias of the threshold voltage of the first drive transistor 110 is required, a voltage value for causing the negative bias of the threshold voltage is provided for the first threshold adjustment gate 111.

In the embodiment of the present application, the target grayscale refers to the grayscale corresponding to the light-emitting element in the static state (which may also be referred to as the "standby state"). Correspondingly, the voltage configured for the drive current control gate of the light-emitting element in the static state may be referred to as the "black state voltage". In an embodiment, the target grayscale may be configured to be the grayscale with the gray scale value of 0, and the first light-emitting element 120, the second light-emitting element 220, and the third light-emitting element 320 emit no light at the grayscale with the gray scale value of 0. In an embodiment, the target grayscale may be configured to be another grayscale (such as the grayscale with the gray scale value of 1 or the grayscale with the gray scale value of 2).

For example, the first light-emitting element 120 is the red light-emitting element R, the second light-emitting element 220 is the green light-emitting element G, and the third light-emitting element 320 is the blue light-emitting element B. The first drive transistor 110, the second drive transistor 210, and the third drive transistor 310 are each the p-type transistor. The threshold voltage of the p-type transistor is a negative value. With the first pixel driving unit 100 as an example, the lower the voltage (that is, the first data voltage corresponding to the first data signal) written into the first drive current control gate 113, the larger the generated drive current; the higher the voltage written into the first drive current control gate 113, the smaller the generated drive current. Due to the performance difference between the light-emitting materials of the light-emitting elements of different colors, pixel driving units of three colors have different efficiency, and thus the pixel driving units of three colors require different black state voltages. In the embodiment of the present application, the result of the tests on the kind of products indicates that with the target grayscale configured to be the grayscale with the gray scale value of 0, for example, the black state voltage of 6.6 V needs to be written into the first drive current control gate 113 of the first drive transistor 110 in the first pixel driving unit 100, the second pixel driving unit 200 requires the black state voltage of 6.8 V, and the third pixel driving unit 300 requires the black state voltage of 6.4 V. To implement the black state display of the display panel, the driver chip needs to meet the highest voltage requirement. Therefore, for the highest data signal outputted by the driver chip, refer to the black state voltage (6.8 V) for the second pixel driving unit 200. However, such a high voltage output range is redundant for the first light-emitting element 120 and the third light-emitting element 320, causing an increase in the power consumption of the driver chip.

In the embodiment of the present application, the voltage of the threshold adjustment gate is adjusted so that the black state voltage for the pixel driving unit can be adjusted. For example, the voltage of the second adjustment signal G_BSM is adjusted so that the threshold voltage of the second drive transistor 210 is positively biased, and the black state voltage for the second pixel driving unit 200 can be reduced. The reason is described below. In the data writing process of the drive transistor, when the threshold voltage of the drive transistor is a negative value, the larger the absolute value of the threshold voltage, the slower data is written; when the threshold voltage of the drive transistor is a positive value, the larger the absolute value of the threshold voltage, the faster data is written. In the embodiment of the present application, the voltage of the second adjustment signal G_BSM is adjusted to be different from the voltage of the first adjustment signal R_BSM and a voltage of the third adjustment signal B_BSM so that the threshold voltage of the second drive transistor 210 can be positively biased, thereby accelerating the writing of the second data signal and making it convenient to implement the black state display of the second light-emitting element 220 by using a smaller black state voltage. Thus, the embodiment of the present application can make the black state voltages for the first pixel driving unit 100, the second pixel driving unit 200, and the third pixel driving unit 300 tend to be consistent, facilitating the decrease in the voltage range of the data signal outputted by the driver chip, improving the utilization rate of the voltage range of the data signal, and reducing the power consumption of the display panel.

Figure 5:
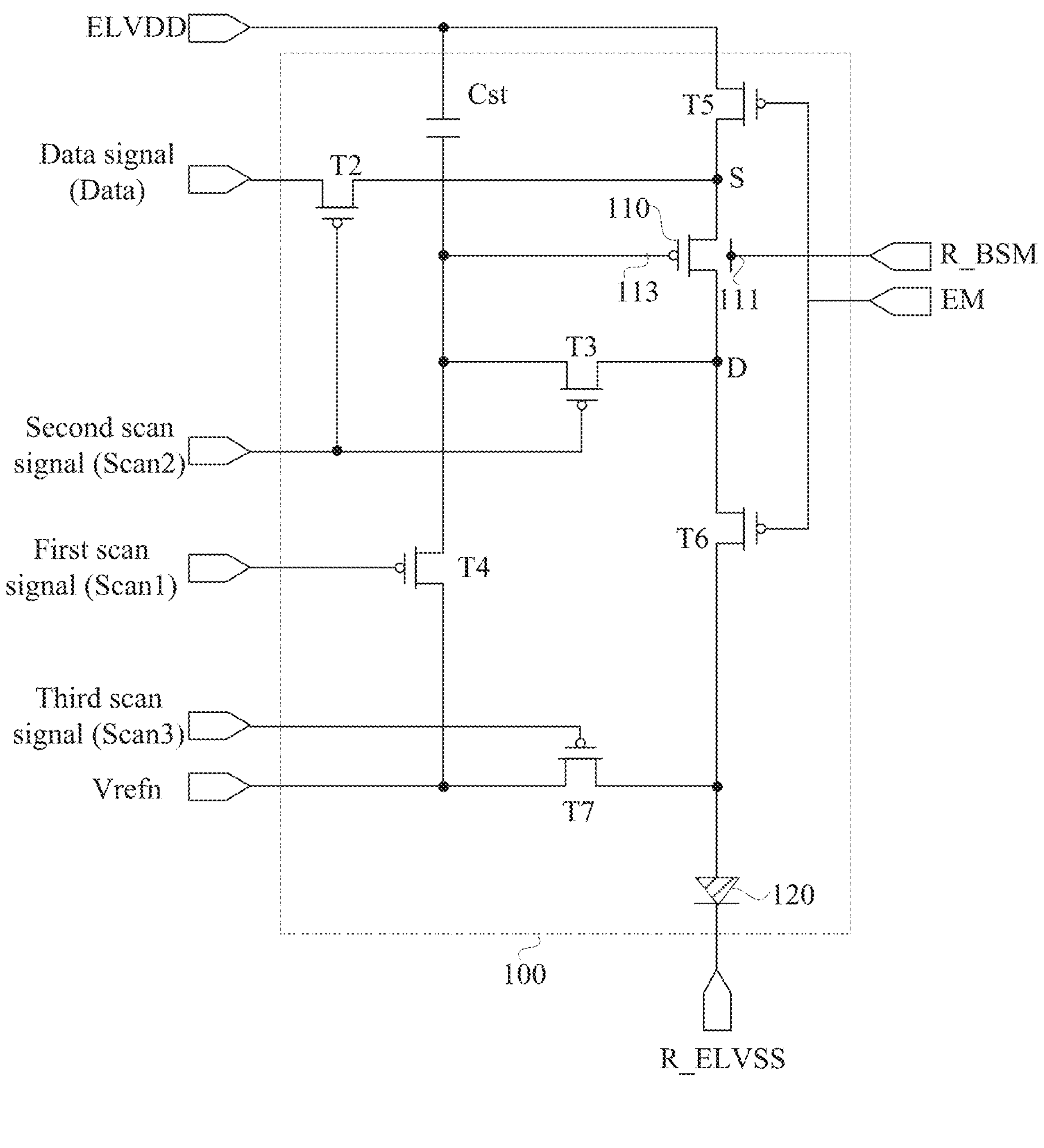
FIG. 5 is another circuit diagram of a pixel driving circuit according to an embodiment of the present application.

FIG. 5 is another circuit diagram of a pixel driving circuit according to an embodiment of the present application. Referring to FIG. 5, with the first pixel driving unit 100 as an example, the embodiment of the present application provides a circuit structure. In an embodiment of the present application, the first pixel driving unit 100 may include the first drive transistor 110, a second transistor T2, a third transistor T3, a fourth transistor T4, a fifth transistor T5, a sixth transistor T6, a seventh transistor T7, and a storage capacitor Cst. The pixel driving circuit further includes a first scan line providing a first scan signal Scan1, a second scan line providing a second scan signal Scan2, a third scan line providing a third scan signal Scan3, a light emission control signal line providing a light emission control signal EM, a reference voltage signal line providing a reference voltage signal Vrefn, and a data line providing a data signal Data.

The second transistor T2 is a data write transistor, the third transistor T3 is a threshold compensation transistor, the fourth transistor T4 is a gate initialization transistor, the fifth transistor T5 and the sixth transistor T6 are each a light emission control transistor, and the seventh transistor T7 is an anode initialization transistor. For example, the preceding transistors are each the p-type transistor.

A gate electrode of the second transistor T2 accesses the second scan signal Scan2, a first electrode of the second transistor T2 is connected to the source electrode S of the first drive transistor 110, and a second electrode of the second transistor T2 accesses the data signal Data. A gate electrode of the third transistor T3 accesses the second scan signal Scan2, a first electrode of the third transistor T3 is connected to the drain electrode D of the first drive transistor 110, and a second electrode of the third transistor T3 is connected to the first drive current control gate 113 of the first drive transistor 110. A gate electrode of the fourth transistor T4 accesses the first scan signal Scan1, a first electrode of the fourth transistor T4 is connected to the first drive current control gate 113 of the first drive transistor 110, and a second electrode of the fourth transistor T4 accesses the reference voltage signal Vrefn. A gate electrode of the fifth transistor T5 accesses the light emission control signal EM, a first electrode of the fifth transistor T5 is connected to the source electrode S of the first drive transistor 110, and a second electrode of the fifth transistor T5 accesses the voltage ELVDD. A gate electrode of the sixth transistor T6 accesses the light emission control signal EM, a first electrode of the sixth transistor T6 is connected to the drain electrode D of the first drive transistor 110, and a second electrode of the sixth transistor T6 is connected to an anode of the first light-emitting element 120. A gate electrode of the seventh transistor T7 accesses the third scan signal Scan3, a first electrode of the seventh transistor T7 is connected to the anode of the first light-emitting element 120, and a second electrode of the seventh transistor T7 accesses the reference voltage signal Vrefn.

For example, a driving process of the first pixel driving unit 100 includes a gate initialization stage, a data write stage, an anode initialization stage, and a light emission stage.

In the gate initialization stage, the light emission control signal EM, the second scan signal Scan2, and the third scan signal Scan3 are all at a high level, and the first scan signal Scan1 is at a low level. The light emission control signal EM controls the fifth transistor T5 and the sixth transistor T6 to be turned off; the second scan signal Scan2 controls the second transistor T2 and the third transistor T3 to be turned off; and the third scan signal Scan3 controls the seventh transistor T7 to be turned off. The first scan signal Scan1 controls the fourth transistor T4 to be turned on, and the reference voltage signal Vrefn initializes the first drive current control gate 113 of the first drive transistor 110, so as to ensure that in the data write stage, the first drive transistor 110 is in an on state.

In the data write stage, the light emission control signal EM, the first scan signal Scan1, and the third scan signal Scan3 are all at a high level, and the second scan signal Scan2 is at a low level. The light emission control signal EM controls the fifth transistor T5 and the sixth transistor T6 to be turned off; the first scan signal Scan 1 controls the fourth transistor T4 to be turned off; and the third scan signal Scan3 controls the seventh transistor T7 to be turned off. The second scan signal Scan2 controls the second transistor T2 and the third transistor T3 to be turned on so that the data signal Data is written into the first drive current control gate 113 of the first drive transistor 110 through the source electrode S and the drain electrode D of the first drive transistor 110, and the first adjustment signal R_BSM is written into the first threshold adjustment gate 111 of the first drive transistor 110 to adjust the threshold voltage of the first drive transistor 110.

In the anode initialization stage, the light emission control signal EM, the first scan signal Scan1, and the second scan signal Scan2 are all at a high level, and the third scan signal Scan3 is at a low level. The light emission control signal EM controls the fifth transistor T5 and the sixth transistor T6 to be turned off; the first scan signal Scan1 controls the fourth transistor T4 to be turned off; and the second scan signal Scan2 controls the second transistor T2 and the third transistor T3 to be turned off. The third scan signal Scan3 controls the seventh transistor T7 to be turned on so that the reference voltage signal Vrefn initializes the anode of the first light-emitting element 120.

In the light emission stage, the first scan signal Scan1, the second scan signal Scan2, and the third scan signal Scan3 are all at a high level. The light emission control signal EM is at a low level or changes periodically, which is not limited in the present application. The first scan signal Scan1 controls the fourth transistor T4 to be turned off; the second scan signal Scan2 controls the second transistor T2 and the third transistor T3 to be turned off; and the third scan signal Scan3 controls the seventh transistor T7 to be turned off. When the light emission control signal EM controls the fifth transistor T5 and the sixth transistor T6 to be turned on, the first drive transistor 110 generates the drive current, and the drive current flows into the anode of the first light-emitting element 120 to drive the first light-emitting element 120 to emit light.

The first adjustment signal R_BSM may be continuously provided in the entire driving process, or the first adjustment signal R_BSM may be provided in the data write stage and the light emission stage, which is not limited in the present application.

Figure 6:
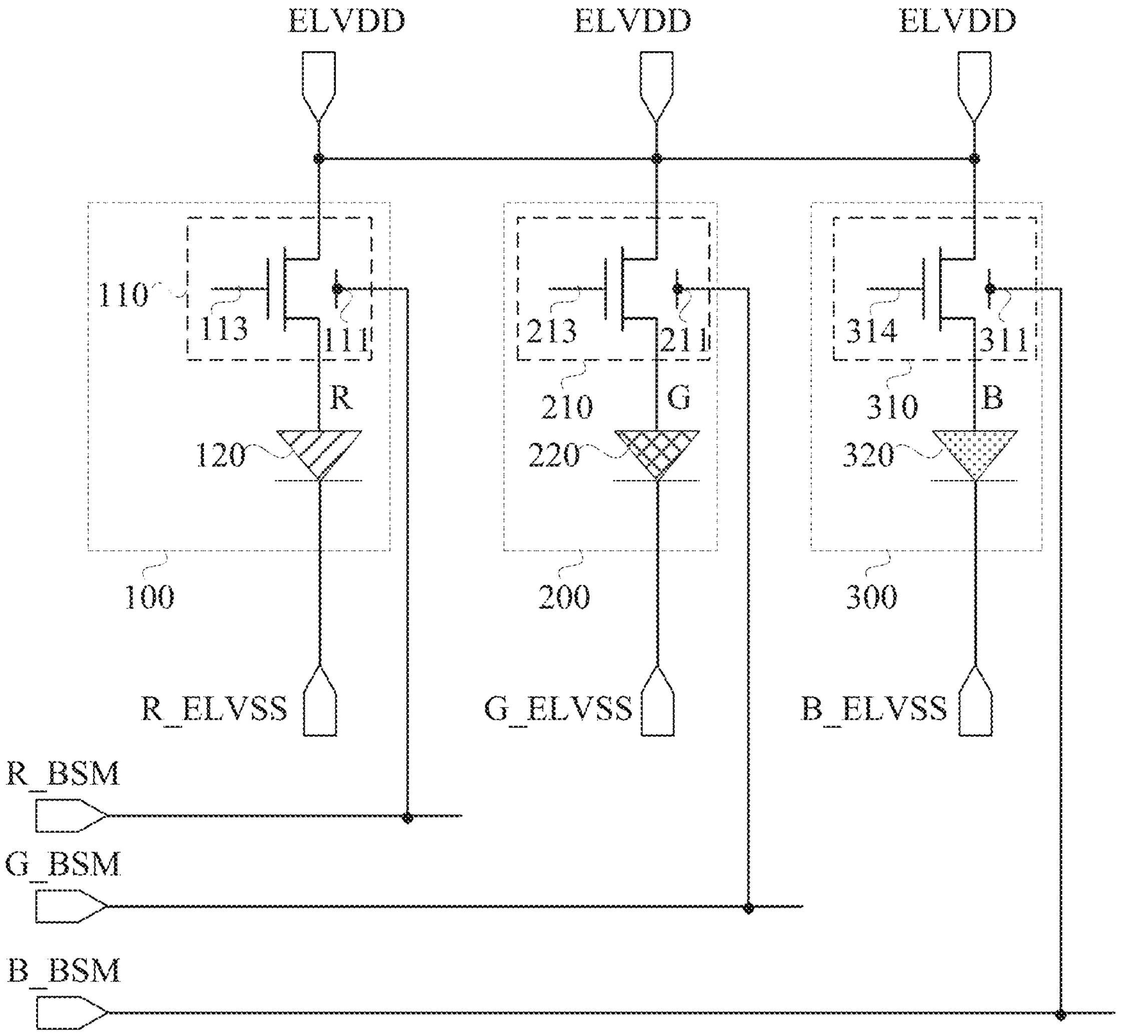
FIG. 6 is another circuit diagram of a pixel driving circuit according to an embodiment of the present application.

FIG. 6 is another circuit diagram of a pixel driving circuit according to an embodiment of the present application. Referring to FIG. 6, a difference from the preceding embodiment is that at least two of the first drive transistor 110, the second drive transistor 210, and the third drive transistor 310 are n-type transistors. In an embodiment, the first drive transistor 110, the second drive transistor 210, and the third drive transistor 310 are all n-type transistors, so as to simplify a preparation technique. In contrast to that of the p-type transistor, a threshold voltage of an n-type transistor is a positive value, and the black state voltage for each pixel driving unit is a negative value. For example, the first light-emitting element 120 is the red light-emitting element R, the second light-emitting element 220 is the green light-emitting element G, and the third light-emitting element 320 is the blue light-emitting element B. When the first light-emitting element 120, the second light-emitting element 220, and the third light-emitting element 320 perform at the target grayscale, the voltage of the second adjustment signal G_BSM is different from the voltage of the first adjustment signal R_BSM and the voltage of the third adjustment signal B_BSM, and the voltage of the second adjustment signal G_BSM has a relatively large difference from the voltage of the first adjustment signal R_BSM and the voltage of the third adjustment signal B_BSM. The threshold voltage in the second pixel driving unit 200 is adjusted to be negatively biased so that the black state voltage for the second pixel driving unit 200 can be increased. In this manner, the black state voltages for the first pixel driving unit 100, the second pixel driving unit 200, and the third pixel driving unit 300 can tend to be consistent, facilitating the decrease in the voltage range of the data signal outputted by the driver chip, maximizing the utilization rate of the voltage range of the data signal, and reducing the power consumption of the display panel.

In another embodiment of the present application, voltage values of the first adjustment signal R_BSM, the second adjustment signal G_BSM, and the third adjustment signal B_BSM make the threshold voltages in the first pixel driving unit 100, the second pixel driving unit 200, and the third pixel driving unit 300 positively biased, respectively. This is because the threshold voltage of the n-type drive transistor fluctuates greatly and may be lower than 0 due to a technique of a drive transistor of indium gallium zinc oxide (IGZO). In some embodiments, the pixel driving circuit can compensate for the threshold voltage of the n-type drive transistor on the premise that the threshold voltage of the drive transistor is a positive value. If the threshold voltage of the drive transistor is lower than 0, the threshold voltage cannot be compensated for, resulting in display non-uniformity of the display panel. Therefore, in the embodiment of the present application, it is set that the voltage values of the first adjustment signal R_BSM, the second adjustment signal G_BSM, and the third adjustment signal B_BSM make all the threshold voltages in the first pixel driving unit 100, the second pixel driving unit 200, and the third pixel driving unit 300 positively biased, so as to avoid the case where the threshold voltage of the n-type drive transistor is lower than 0 and ensure a threshold compensation effect.

In the preceding embodiments, to implement low power consumption of the display panel, the threshold voltage in the second pixel driving unit 200 needs to be negatively biased; and to ensure that the threshold voltage is higher than 0, the threshold voltage in the pixel driving unit needs to be positively biased. Both the negative bias and the positive bias are implemented relative to the threshold voltage before adjustment. In fact, when the voltage of the threshold adjustment gate of the drive transistor is a fixed value, the threshold voltage of the drive transistor is determined. As long as a proper voltage of the threshold adjustment gate is selected, the threshold voltage of the drive transistor can be guaranteed to be higher than 0 and the black state voltage for the pixel driving unit can be adjusted to make the black state voltages for different pixel driving units tend to be consistent. In some embodiments, when the first light-emitting element 120, the second light-emitting element 220, and the third light-emitting element 320 perform at the target grayscale, to maximize the utilization rate of the voltage range of the data signal (that is, the first data signal, the second data signal, and the third data signal have the same voltage value), it needs to be set that at least two of the first adjustment signal R_BSM, the second adjustment signal G_BSM, and the third adjustment signal B_BSM have different voltage values, which means that the voltage of the first adjustment signal R_BSM may be configured to be different from the voltage of the second adjustment signal G_BSM and the voltage of the third adjustment signal B_BSM, the voltage of the second adjustment signal G_BSM may be configured to be different from the voltage of the first adjustment signal R_BSM and the voltage of the third adjustment signal B_BSM, or the voltage of the third adjustment signal B_BSM may be configured to be different from the voltage of the first adjustment signal R_BSM and the voltage of the second adjustment signal G_BSM. In some other embodiments, when the first light-emitting element 120, the second light-emitting element 220, and the third light-emitting element 320 perform at the target grayscale, to maximize the utilization rate of the voltage range of the data signal (that is, the first data signal, the second data signal, and the third data signal have the same voltage value), it needs to be set that the voltage values of the first adjustment signal R_BSM, the second adjustment signal G_BSM, and the third adjustment signal B_BSM are different from each other.

In the preceding embodiments, an example in which the target grayscale is configured to be the grayscale with the gray scale value of 0 is used because the voltage corresponding to the grayscale with the gray scale value of 0 determines the highest voltage value of a data voltage, which is not to limit the present application. In practical application, the target grayscale may be any grayscale value of all display grayscales.

Referring to FIGS. 2 and 6, the first light-emitting element 120 has a first cathode, a first cathode signal R_ELVSS is exerted to the first cathode, the second light-emitting element 220 has a second cathode, a second cathode signal G_ELVSS is exerted to the second cathode, the third light-emitting element 320 has a third cathode, and a third cathode signal B_ELVSS is exerted to the third cathode. At least two of the first cathode signal R_ELVSS, the second cathode signal G_ELVSS, and the third cathode signal B_ELVSS have different voltage values.

As can be seen from the preceding analysis, light-emitting materials of different colors have different performances, and the light-emitting elements of different colors have different turn-on voltages and black state voltages, so pixel driving units have different efficiency and the display panel has a non-uniform display. In the embodiment of the present application, it is set that at least two of the first cathode signal R_ELVSS, the second cathode signal G_ELVSS, and the third cathode signal B_ELVSS have different voltage values so that voltage differences between the first light-emitting element 120, the second light-emitting element 220, and the third light-emitting element 320 can be compensated for, thereby balancing the efficiency of the first pixel driving unit 100, the second pixel driving unit 200, and the third pixel driving unit 300 and improving the uniformity of the display panel.

In an embodiment, a voltage of the second cathode signal G_ELVSS is different from a voltage of the first cathode signal R_ELVSS and the third cathode signal B_ELVSS; a voltage of the first cathode signal R_ELVSS is different from a voltage of the second cathode signal G_ELVSS and the third cathode signal B_ELVSS; a voltage of the third cathode signal B_ELVSS is different from a voltage of the first cathode signal R_ELVSS and the second cathode signal G_ELVSS; or voltage values of the first cathode signal R_ELVSS, the second cathode signal G_ELVSS, and the third cathode signal B_ELVSS are different from each other.

In practical application, magnitudes of the voltage of the first adjustment signal R_BSM, the voltage of the second adjustment signal G_BSM, and the voltage of the third adjustment signal B_BSM may be set as required, which are not limited in the present application. For example, the magnitudes are determined through multiple trials or determined through mathematical modeling and simulation, as long as it can be satisfied that the black state voltages for the first pixel driving unit 100, the second pixel driving unit 200, and the third pixel driving unit 300 tend to be consistent.

To conclude, in the embodiment of the present application, it is set that the first light-emitting element 120, the second light-emitting element 220, and the third light-emitting element 320 have different light emitting colors, and when the first light-emitting element 120, the second light-emitting element 220, and the third light-emitting element 320 perform at the target grayscale, at least two of the first adjustment signal R_BSM, the second adjustment signal G_BSM, and the third adjustment signal B_BSM have different voltage values so that the threshold voltages of the first drive transistor 110, the second drive transistor 210, and the third drive transistor 310 can be adjusted, and thus the black state voltages for the first pixel driving unit 100, the second pixel driving unit 200, and the third pixel driving unit 300 tend to be consistent, facilitating the decrease in the voltage range of the data signal outputted by the driver chip, improving the utilization rate of the voltage range of the data signal, and reducing the power consumption of the display panel.

Embodiments of the present application further provide a display panel. The display panel includes the pixel driving circuit according to any embodiment of the present application and has similar technical principles and achieved effects. The details are not repeated.

Figure 7:
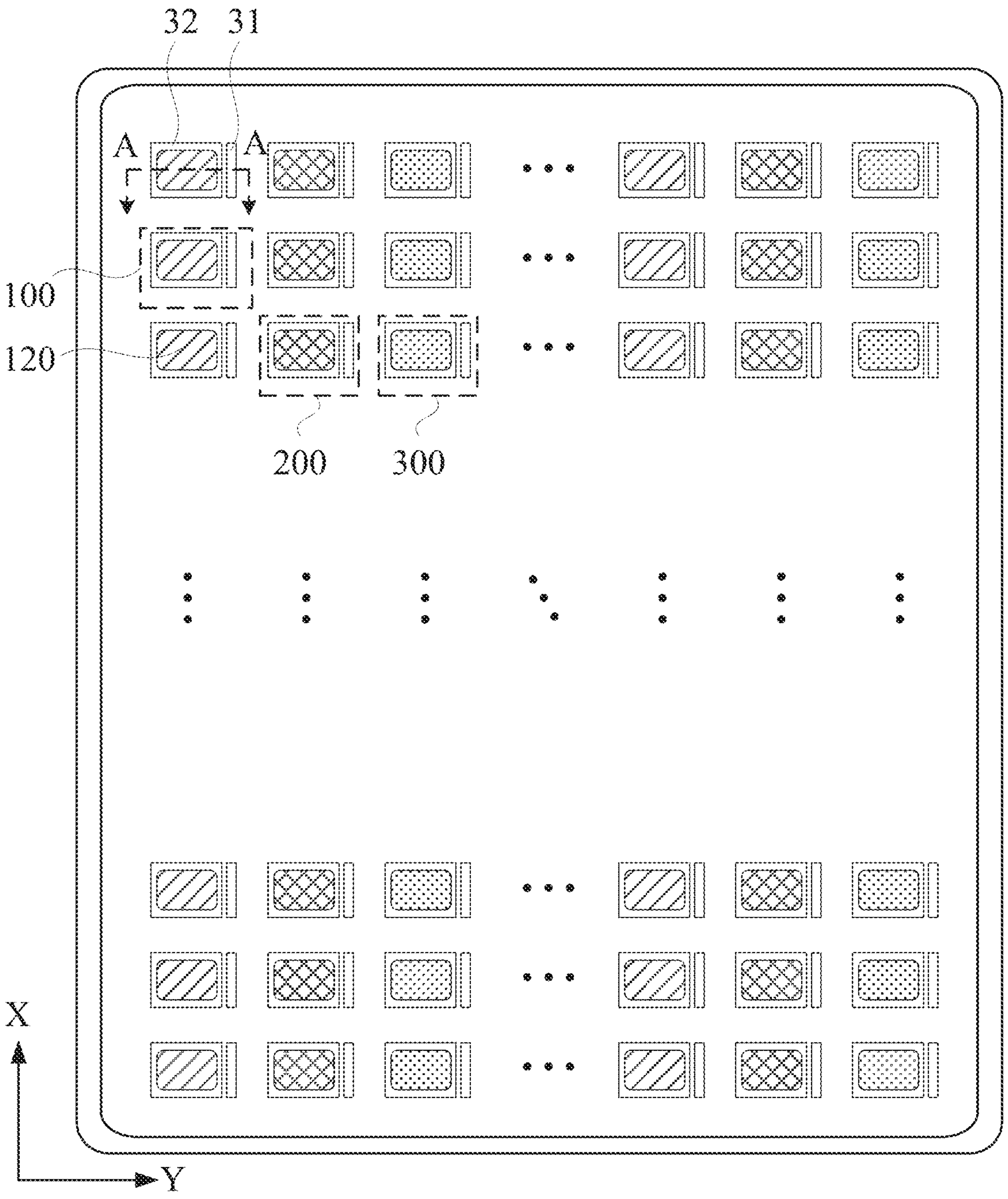
FIG. 7 is a structure diagram of a display panel according to an embodiment of the present application.
Figure 8:
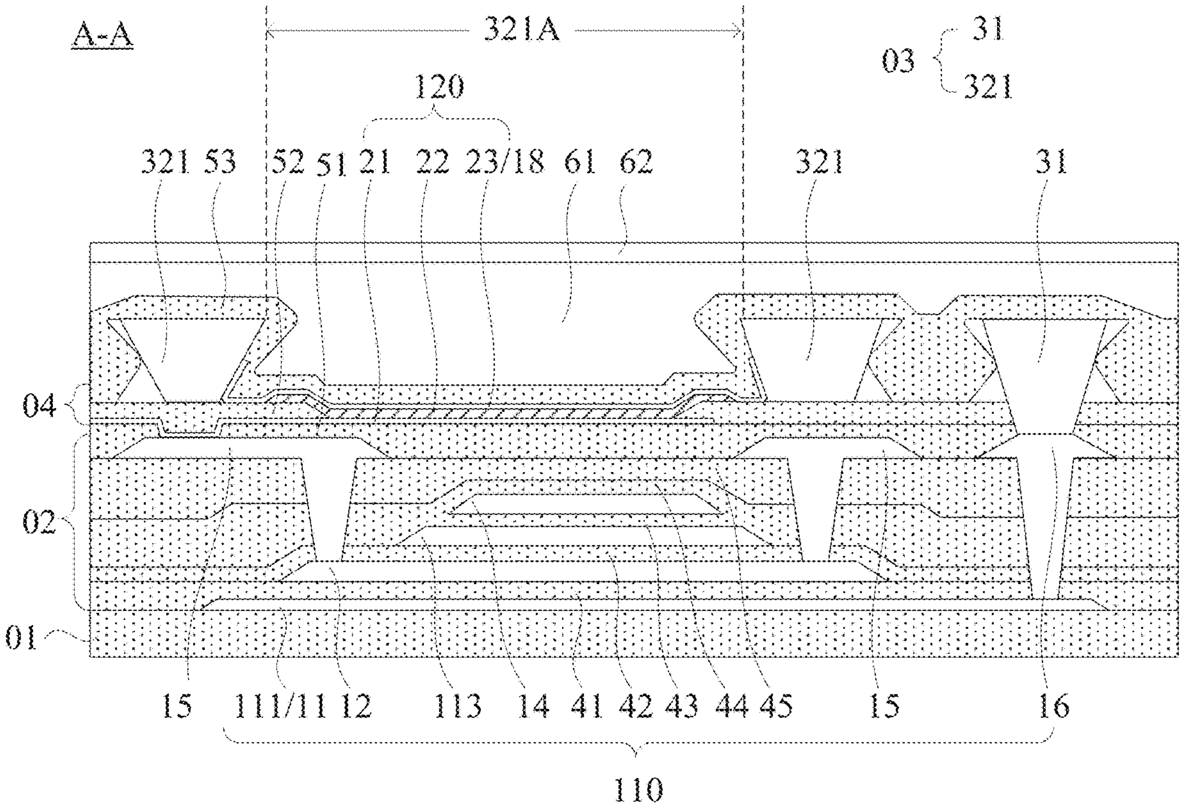
FIG. 8 is a sectional view of a first pixel driving unit of FIG. 7 taken along A-A.
Figure 9:
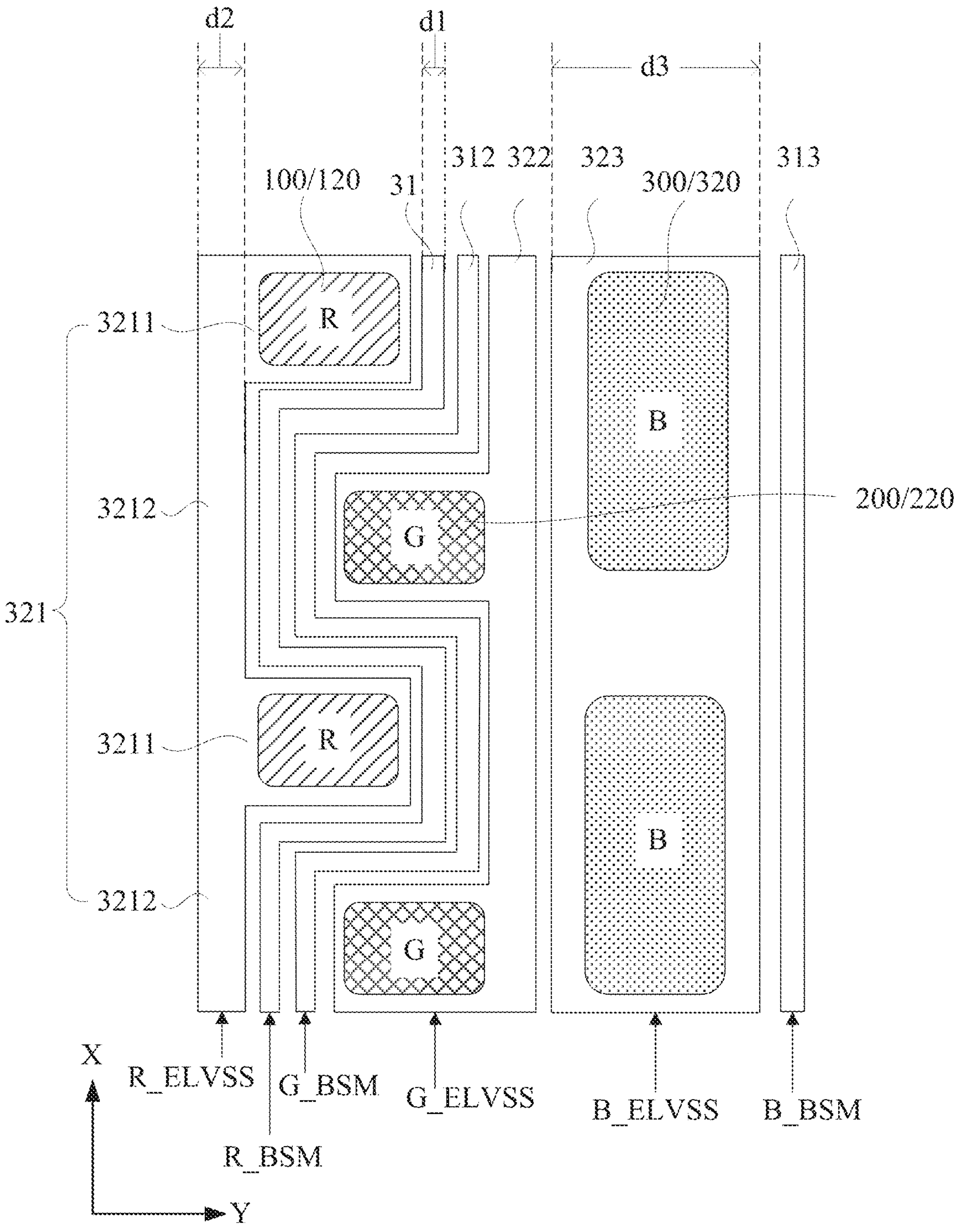
FIG. 9 is a partial structure diagram of a display panel according to an embodiment of the present application.

FIG. 7 is a structure diagram of a display panel according to an embodiment of the present application. FIG. 8 is a sectional view of a first pixel driving unit of FIG. 7 taken along A-A. FIG. 9 is a partial structure diagram of a display panel according to an embodiment of the present application. The first pixel driving unit 100 and the second pixel driving unit 200 are arranged in the same manner. In FIG. 8, a sectional structure of the first pixel driving unit 100 along A-A is used as an example. Referring to FIGS. 7, 8, and 9, the display panel further includes a first metal layer, a light-emitting function layer, and an isolation layer.

The first threshold adjustment gate 111 and the second threshold adjustment gate 211 (not shown in FIG. 8) are electrically isolated from each other and are disposed in the first metal layer 11.

The light-emitting function layer is disposed on a side of the first metal layer 11, and part of the first light-emitting element 120 and part of the second light-emitting element 220 (not shown in FIG. 8) are disposed in the light-emitting function layer.

The isolation layer is disposed on a side of the first metal layer 11 and configured to isolate the first light-emitting element 120 from the second light-emitting element 220, and the isolation layer includes at least one first gate isolation column 31 and at least one second gate isolation column 312 (not shown in FIG. 8).

The at least one first gate isolation column 31 is coupled to the first threshold adjustment gate 111, the first adjustment signal R_BSM is exerted to the at least one first gate isolation column 31, the at least one second gate isolation column 312 is coupled to the second threshold adjustment gate 211, and the second adjustment signal G_BSM is exerted to the at least one second gate isolation column 312. For example, the first gate isolation column 31 is electrically connected to the first threshold adjustment gate 111 across films through an overpass connection line 16.

As can be seen from the preceding analysis, based on the structure of the display panel, when the first light-emitting element 120 and the second light-emitting element 220 perform at the target grayscale, the first data signal and the second data signal can have the same voltage value and the first adjustment signal R_BSM and the second adjustment signal G_BSM can have different voltage values in the embodiments of the present application so that the black state voltages for the first pixel driving unit 100 and the second pixel driving unit 200 tend to be consistent, facilitating the decrease in the voltage range of the data signal outputted by the driver chip, improving the utilization rate of the voltage range of the data signal, and reducing the power consumption of the display panel.

Additionally, in the embodiment of the present application, structures of the first drive transistor 110 and the second drive transistor 210 are improved to improve the performance of the drive transistor. For example, the at least one first gate isolation column 31 in the isolation layer is used for carrying the first adjustment signal R_BSM, facilitating a decrease in resistance during transmission of the first adjustment signal R_BSM; similarly, the second threshold adjustment gate 211 is added to the second drive transistor 210, and the at least one second gate isolation column 312 in the isolation layer is used for carrying the second adjustment signal G_BSM, facilitating a decrease in resistance during transmission of the second adjustment signal G_BSM.

Still referring to FIG. 7, the pixel driving circuit may further include at least one third pixel driving unit 300. Referring to the structure of the first pixel driving unit 100 in FIG. 8, the third pixel driving unit 300 is arranged in a manner similar to the arrangement manner of the first pixel driving unit 100. The third pixel driving unit 300 includes a third drive transistor 310 and a third light-emitting element 320, the third drive transistor 310 has a third drive current control gate 314 and a third threshold adjustment gate 311, the third drive current control gate 314 is configured to receive a third data signal, the third threshold adjustment gate 311 is configured to receive a third adjustment signal B_BSM, and the third drive transistor 310 drives the third light-emitting element 320 under the control of the third data signal and the third adjustment signal B_BSM. The third threshold adjustment gate 311 is electrically isolated from the first threshold adjustment gate 111, the third threshold adjustment gate 311 is electrically isolated from the second threshold adjustment gate 211, and the third threshold adjustment gate 311 is disposed in the first metal layer 11. Part of the third light-emitting element 320 is disposed in the light-emitting function layer. The isolation layer is further configured to isolate the third light-emitting element 320 from the first light-emitting element 120, the isolation layer is further configured to isolate the third light-emitting element 320 from the second light-emitting element 220, the isolation layer includes at least one third gate isolation column 313, the at least one third gate isolation column 313 is coupled to the third threshold adjustment gate 311, and the third adjustment signal B_BSM is exerted to the at least one third gate isolation column 313.

It can be seen that when the first light-emitting element 120, the second light-emitting element 220, and the third light-emitting element 320 perform at the target grayscale, the first data signal, the second data signal, and the third data signal have the same voltage value and at least two of the first adjustment signal R_BSM, the second adjustment signal G_BSM, and the third adjustment signal B_BSM have different voltage values in the embodiments of the present application so that the black state voltages for the first pixel driving unit 100, the second pixel driving unit 200, and the third pixel driving unit 300 tend to be consistent, facilitating the decrease in the voltage range of the data signal outputted by the driver chip, improving the utilization rate of the voltage range of the data signal, and reducing the power consumption of the display panel. Additionally, in the embodiment of the present application, the structure of the third drive transistor 310 is improved to improve the performance of the drive transistor. For example, the third threshold adjustment gate 311 is added to the third drive transistor 310, and the at least one third gate isolation column 313 in the isolation layer is used for carrying the third adjustment signal B_BSM, facilitating a decrease in resistance during transmission of the third adjustment signal B_BSM.

Such a setting helps to improve the uniformity of the voltage of the first adjustment signal R_BSM received by the first pixel driving unit 100, the uniformity of the voltage of the second adjustment signal G_BSM received by the second pixel driving unit 200, and the uniformity of the voltage of the third adjustment signal B_BSM received by the third pixel driving unit 300, thereby facilitating an improvement in the display uniformity of the display panel.

Still referring to FIGS. 7, 8, and 9, the display panel may further include a cathode layer 18, the cathode layer 18 is disposed on a side of the light-emitting function layer away from the first metal layer 11, and the isolation layer further includes at least one first cathode isolation column 321, at least one second cathode isolation column 322 (not shown in FIG. 8), and at least one third cathode isolation column 323 (not shown in FIG. 8), where the first light-emitting element 120 has a first cathode 23, the second light-emitting element 220 has a second cathode, the third light-emitting element 320 has a third cathode, and the first cathode 23, the second cathode, and the third cathode are all disposed in the cathode layer 18 and are electrically isolated from each other; and the at least one first cathode isolation column 321 is coupled to the first cathode 23, a first cathode signal is exerted to the at least one first cathode isolation column 321, the at least one second cathode isolation column 322 is coupled to the second cathode, a second cathode signal is exerted to the at least one second cathode isolation column 322, the at least one third cathode isolation column 323 is coupled to the third cathode, and a third cathode signal is exerted to the at least one third cathode isolation column 323. Such a setting facilitates the setting that at least two of the first cathode signal, the second cathode signal, and the third cathode signal have different voltage values so that voltage differences between the first light-emitting element 120, the second light-emitting element 220, and the third light-emitting element 320 can be compensated for, thereby balancing the efficiency of the first pixel driving unit 100, the second pixel driving unit 200, and the third pixel driving unit 300 and improving the uniformity of the display panel.

It is to be understood that functions of the at least one first gate isolation column 31, the at least one second gate isolation column 312, and the at least one third gate isolation column 313 are to isolate the first light-emitting element 120, the second light-emitting element 220, and the third light-emitting element 320 from each other and carry the corresponding adjustment signals; correspondingly, functions of the at least one first cathode isolation column 321, the at least one second cathode isolation column 322, and the at least one third cathode isolation column 323 are to isolate the first light-emitting element 120, the second light-emitting element 220, and the third light-emitting element 320 from each other and carry the corresponding cathode signals.

In an embodiment, the at least one first gate isolation column 31, the at least one second gate isolation column 312, the at least one third gate isolation column 313, the at least one first cathode isolation column 321, the at least one second cathode isolation column 322, and the at least one third cathode isolation column 323 are each an integral structure, for example, a section of the integral structure may be in the shape of a trapezoid with an upper side longer than a lower side. Such a setting facilitates the preparation of isolation columns. In an embodiment, the at least one first gate isolation column 31, the at least one second gate isolation column 312, the at least one third gate isolation column 313, the at least one first cathode isolation column 321, the at least one second cathode isolation column 322, and the at least one third cathode isolation column 323 may be prepared by the same technique. In an embodiment, the at least one first gate isolation column 31, the at least one second gate isolation column 312, the at least one third gate isolation column 313, the at least one first cathode isolation column 321, the at least one second cathode isolation column 322, and the at least one third cathode isolation column 323 may each be a layered structure, which is not limited in the present application.

Still referring to FIGS. 7 and 8, the display panel may further include other films such as an active layer, a second metal layer, a third metal layer, a fourth metal layer, and an anode metal layer. An insulating layer (such as a first insulating layer 41, a second insulating layer 42, a third insulating layer 43, and a fourth insulating layer 44) is disposed between films.

With the first pixel driving unit 100 as an example, a semiconductor 12 of the first drive transistor 110 is disposed in the active layer, and the first drive current control gate 113 is disposed in the second metal layer. In this embodiment, the first threshold adjustment gate 111 is located at the bottom of the semiconductor 12 and may also be referred to as a bottom gate; and the first drive current control gate 113 is located at the top of the semiconductor 12 and may also be referred to as a top gate. A capacitor plate 14 is disposed in the third metal layer. For example, the capacitor plate 14 overlaps the first drive current control gate 113 to form a storage capacitor. A source/drain electrode 15 of the first drive transistor 110 is disposed in the fourth metal layer, and the source/drain electrode 15 is electrically connected to the semiconductor 12. An anode 21 of the first light-emitting element 120 is disposed in the anode metal layer, and a light-emitting function layer 22 and the cathode 23 of the first light-emitting element 120 are disposed on the anode 21. For example, the anode 21 is electrically connected to the source/drain electrode 15 of the first drive transistor 110, and the drive current generated by the first drive transistor 110 is transmitted to the anode 21. Under the action of a voltage of the anode 21 and a voltage of the cathode 23, the light-emitting function layer 22 emits light.

In an embodiment, the at least one first gate isolation column 31, the at least one second gate isolation column 312, the at least one third gate isolation column 313, the at least one first cathode isolation column 321, the at least one second cathode isolation column 322, and the at least one third cathode isolation column 323 may be used for planar evaporation of a light-emitting material. For example, with the first pixel driving unit 100 as an example, after array films where the first drive transistor 110 is disposed are prepared, the anode metal layer is formed on the array films and patterned to form the anode 21, and the anode 21 is electrically connected to the source/drain electrode 15 of the first drive transistor 110. A seventh insulating layer 52 (that is, a pixel defining layer) and the isolation layer are prepared on the anode metal layer, and the isolation layer is patterned to form the at least one first gate isolation column 31 and the at least one first cathode isolation column 321 that are tapered from top to bottom. The seventh insulating layer 52 (that is, the pixel defining layer) is patterned to form a pixel opening on the anode 21, and a first light-emitting material is evaporated in the pixel opening. Then, a first cathode material is evaporated on the first light-emitting material.

The first light-emitting material and the first cathode material are each evaporated in the manner of an entire layer. The first light-emitting material and the first cathode material are evaporated in each pixel opening (including pixel openings corresponding to the first pixel driving unit 100, the second pixel driving unit 200, and the third pixel driving unit 300). Since the at least one first cathode isolation column 321 is tapered from top to bottom, the material evaporated into two adjacent pixel openings is disconnected by the at least one first cathode isolation column 321, and an edge portion of the cathode 23 is electrically connected to the at least one first cathode isolation column 321. The first light-emitting material and the first cathode material in pixel openings corresponding to the second pixel driving unit 200 and the third pixel driving unit 300 are removed. Until then, the evaporation of the first light-emitting material and the first cathode material is completed.

Light-emitting materials and cathode materials are evaporated by similar techniques in the pixel openings for the second pixel driving unit 200 and the third pixel driving unit 300. The details are not repeated.

It can be seen that when the display panel according to the embodiments of the present application is used, the light-emitting elements may be evaporated by the technique of planar evaporation without using fine masks, facilitating a decrease in the manufacturing cost of the display panel. Additionally, since the fine masks are not required for use in the embodiments of the present application, the at least one first gate isolation column 31 and the at least one first cathode isolation column 321 are not required to support the fine masks. Therefore, dimensions and positions of the at least one first gate isolation column 31 and the at least one first cathode isolation column 321 may be arbitrarily adjusted as required.

Still referring to FIG. 8, insulating layers between films are arranged in multiple manners, which are described below and not to limit the present application.

The semiconductor 12 may be made of a material such as amorphous silicon (a-Si), polysilicon (p-Si), or an oxide. For example, if the semiconductor 12 is low-temperature polysilicon (LTPS), a p-type drive transistor may be formed; if the semiconductor 12 is IGZO, an n-type drive transistor may be formed. Each of the p-type drive transistor and the n-type drive transistor can be optimized through the adjustment of a voltage of its threshold adjustment gate.

In an embodiment, the first insulating layer 41 may be disposed between the first metal layer 11 and the active layer. The first insulating layer 41 is a base configured to carry films above the first insulating layer 41. The base may be made of an organic material such as polyimide (PI) or an inorganic material such as glass. For example, a film under the first metal layer 11 is also a base, that is, the first metal layer 11 is disposed in a base film.

In an embodiment, the second insulating layer 42 may be disposed between the active layer and the second metal layer. The second insulating layer 42 may also be referred to as a gate insulating layer and forms an insulating layer part of the drive transistor. The second insulating layer 42 may be made of an inorganic material such as silicon nitride (SiN) and/or silicon monoxide (SiO).

In an embodiment, the third insulating layer 43 may be disposed between the second metal layer and the third metal layer. The third insulating layer 43 may also be referred to as an intermediate insulating layer and forms an intermediate dielectric layer of the capacitor. The third insulating layer 43 may be made of an inorganic material such as SiN and/or SiO.

In an embodiment, the fourth insulating layer 44 may be disposed between the third metal layer and the fourth metal layer. The fourth insulating layer may be made of an inorganic material such as SiN and/or SiO.

In an embodiment, a fifth insulating layer 45 may be disposed between the fourth insulating layer 44 and the fourth metal layer. The fifth insulating layer 45 may be made of an organic material and can have a certain planarization function when isolating the third metal layer from the fourth metal layer.

In an embodiment, a sixth insulating layer 51 may be disposed between the fourth metal layer and the anode metal layer. When isolating the fourth metal layer from the anode metal layer, the sixth insulating layer 51 can make a surface of the fourth metal layer planarized, facilitating a flat film for the subsequent preparation of the light-emitting element and optimizing a luminescence effect of the light-emitting element.

In an embodiment, the seventh insulating layer 52 may be disposed on the anode metal layer. The seventh insulating layer 52 may also be referred to as the pixel defining layer and can define a size of the pixel opening when isolating the anode metal layer from the isolation layer.

In an embodiment, an eighth insulating layer 53 may be disposed on the isolation layer. The eighth insulating layer 53 covers the cathode 23 and can isolate the light-emitting element. The eighth insulating layer 53 is further filled between the first gate isolation column 31 and the first cathode isolation column 321 and can isolate the first gate isolation column 31 from the first cathode isolation column 321.

Due to the characteristic of the first gate isolation column 31 and the first cathode isolation column 321 in shape, a space between the first gate isolation column 31 and the first cathode isolation column 321 is tapered from bottom to top and may fail to be filled with the eighth insulating layer 53 during deposition, which is allowed. With the improvement of techniques, the space may be filled with the eighth insulating layer 53. All these cases are within the scope of the present application.

Still referring to FIG. 8, in an embodiment of the present application, each of the first gate isolation column 31 and the first cathode isolation column 321 may be provided integrally. For example, with the first gate isolation column 31 as an example, the first gate isolation column 31 tapered from top to bottom may be prepared by a lift-off technique. For example, a negative photoresist is coated, exposed, and developed to form an opening at a position of the first gate isolation column 31, a metal is evaporated in the opening, and the remaining photoresist is removed to form the first gate isolation column 31 tapered from top to bottom.

In an embodiment, a sealing layer 61 and an encapsulation layer 62 may be disposed on the eighth insulating layer 53. For example, the sealing layer 61 is formed through inkjet printing, and the encapsulation layer 62 is formed through chemical vapor deposition.

In an embodiment, the pixel driving circuit includes a plurality of first pixel driving units 100, a plurality of second pixel driving units 200, and a plurality of third pixel driving units 300. FIG. 9 is a partial structure diagram of a display panel according to an embodiment of the present application. Referring to FIG. 9, first threshold adjustment gates 111 in the plurality of first pixel driving units 100 are coupled by the same first gate isolation column 31, second threshold adjustment gates 211 in the plurality of second pixel driving units 200 are coupled by the same second gate isolation column 312, and third threshold adjustment gates 311 in the plurality of third pixel driving units 300 are coupled by the same third gate isolation column 313.

In this setting manner, the same adjustment voltage can be provided for sub-pixels of the same color so that the number of signal lines is further reduced on the basis that a display effect of the display panel is ensured.

Still referring to FIG. 9, the plurality of first pixel driving units 100 are arranged in a plurality of columns, the plurality of second pixel driving units 200 are arranged in a plurality of columns, and the plurality of third pixel driving units 300 are arranged in a plurality of columns, where first threshold adjustment gates 111 in first pixel driving units 100 in the same column are coupled by the same first gate isolation column 31, second threshold adjustment gates 211 in second pixel driving units 200 in the same column are coupled by the same second gate isolation column 312, and third threshold adjustment gates 311 in third pixel driving units 300 in the same column are coupled by the same third gate isolation column 313.

Still referring to FIG. 9, first cathodes of the plurality of first pixel driving units 100 are coupled by the same first cathode isolation column 321, second cathodes of the plurality of second pixel driving units 200 are coupled by the same second cathode isolation column 322, and third cathodes of the plurality of third pixel driving units 300 are coupled by the same third cathode isolation column 323. In this setting manner, the same cathode voltage can be provided for sub-pixels of the same color so that the number of signal lines is further reduced on the basis that the display effect of the display panel is ensured.

Still referring to FIG. 9, the plurality of first pixel driving units 100 are arranged in the plurality of columns, the plurality of second pixel driving units 200 are arranged in the plurality of columns, and the plurality of third pixel driving units 300 are arranged in the plurality of columns, where first cathodes of the first pixel driving units 100 in the same column are coupled by the same first cathode isolation column 321, second cathodes of the second pixel driving units 200 in the same column are coupled by the same second cathode isolation column 322, and third cathodes of the third pixel driving units 300 in the same column are coupled by the same third cathode isolation column 323.

Still referring to FIGS. 8 and 9, the first cathode isolation column 321 surrounds the first pixel driving unit 100, and the first gate isolation column 31 is located on the periphery of the first cathode isolation column 321; the second cathode isolation column 322 surrounds the second pixel driving unit 200, and the second gate isolation column 312 is located on the periphery of the second cathode isolation column 322; and the third cathode isolation column 323 surrounds the third pixel driving unit 300, and the third gate isolation column 313 is located on the periphery of the third cathode isolation column 323.

In an embodiment, the first gate isolation column 31 is closer to the first pixel driving unit 100, the second gate isolation column 312 is closer to the second pixel driving unit 200, and the third gate isolation column 313 is closer to the third pixel driving unit 300, so as to simplify a wiring manner.

In an array, rows and columns are relative concepts. Generally, a vertical direction is considered as a column, and a horizontal direction is considered as a row. From different angles, the vertical direction and the horizontal direction are interchangeable, so the row may also be referred to as the column, and the column may also be referred to as the row.

Figure 10:
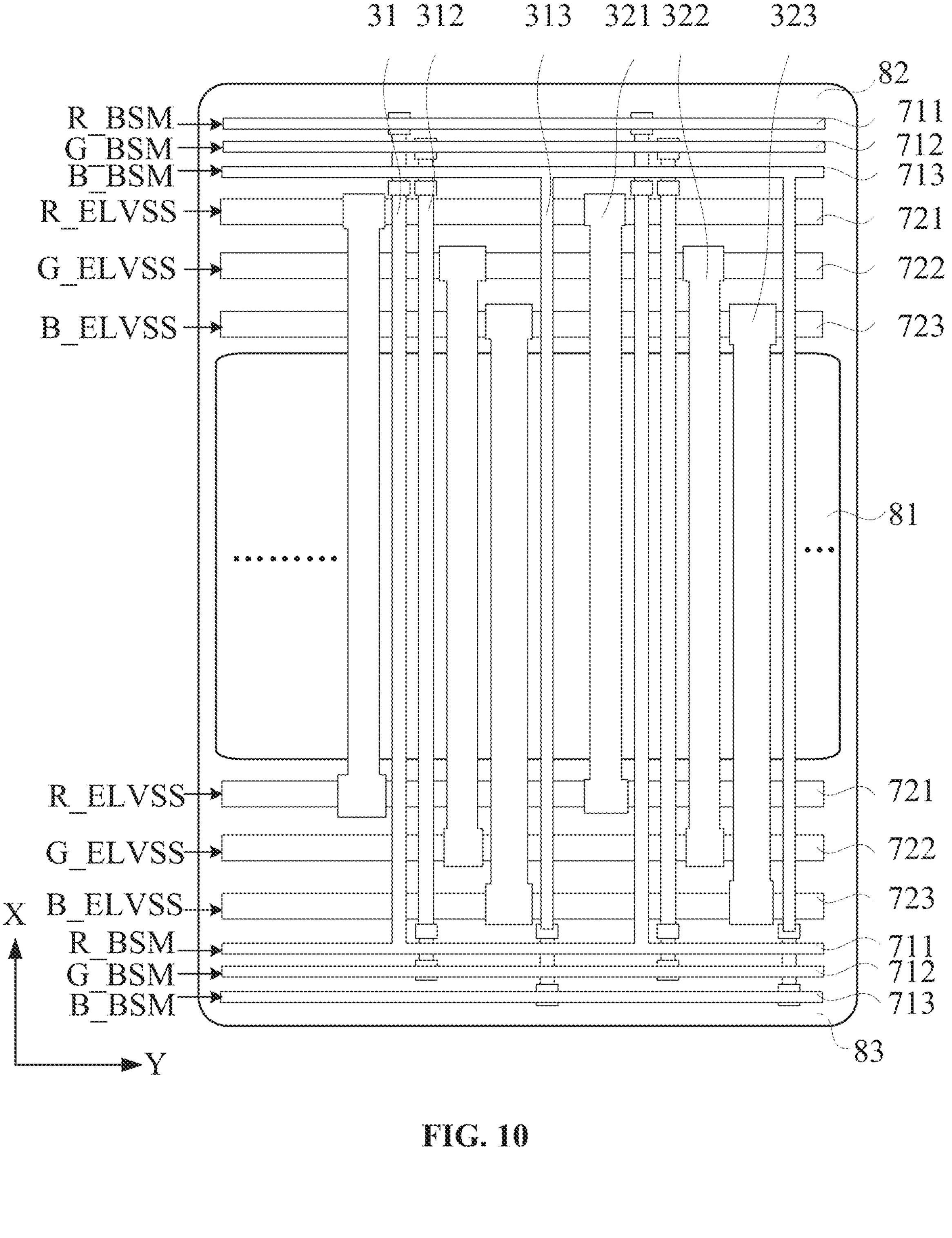
FIG. 10 is another structure diagram of a display panel according to an embodiment of the present application.

FIG. 10 is another structure diagram of a display panel according to an embodiment of the present application. Referring to FIG. 10, the display panel may have a display region 81 and a bezel region (including, for example, an upper bezel region 82 and a lower bezel region 83) adjacent to each other, the pixel driving circuit is disposed in the display region 81, and the display panel includes a first threshold adjustment bus line 711, a second threshold adjustment bus line 712, and a third threshold adjustment bus line 713. The first threshold adjustment bus line 711 is disposed in the bezel region, and the at least one first gate isolation column 31 is coupled to the first threshold adjustment bus line 711; the second threshold adjustment bus line 712 is disposed in the bezel region, and the at least one second gate isolation column 312 is coupled to the second threshold adjustment bus line 712; and the third threshold adjustment bus line 713 is disposed in the bezel region, and the at least one third gate isolation column 313 is coupled to the third threshold adjustment bus line 713. In this manner, the wiring of the display panel is further simplified.

In an embodiment, the plurality of first pixel driving units 100 are arranged in the plurality of columns, the plurality of second pixel driving units 200 are arranged in the plurality of columns, the plurality of third pixel driving units 300 are arranged in the plurality of columns, the plurality of columns extend along a first direction X, the first threshold adjustment bus line 711, the second threshold adjustment bus line 712, and the third threshold adjustment bus line 713 extend along a second direction Y, respectively, and the first direction X and the second direction Y have an included angle. In an embodiment, the first direction X is perpendicular to the second direction Y.

Referring to FIG. 10, the display panel may further include a first cathode bus line 721, a second cathode bus line 722, and a third cathode bus line 723. The first cathode bus line 721 is disposed in the bezel region, and the at least one first cathode isolation column 321 is coupled to the first cathode bus line 721; the second cathode bus line 722 is disposed in the bezel region, and the at least one second cathode isolation column 322 is coupled to the second cathode bus line 722; and the third cathode bus line 723 is disposed in the bezel region, and the at least one third cathode isolation column 323 is coupled to the third cathode bus line 723. In this manner, the wiring of the display panel is further simplified.

In an embodiment, the plurality of first pixel driving units 100 are arranged in the plurality of columns, the plurality of second pixel driving units 200 are arranged in the plurality of columns, the plurality of third pixel driving units 300 are arranged in the plurality of columns, the plurality of columns extend along the first direction X, the first cathode bus line 721, the second cathode bus line 722, and the third cathode bus line 723 extend along the second direction Y, and the first direction X and the second direction Y have an included angle. In an embodiment, the first direction X is perpendicular to the second direction Y.

Still referring to FIG. 10, in an embodiment of the present application, the display panel further includes the upper bezel region 82 and the lower bezel region 83, the upper bezel region 82 is located at the top of the display region 81, and the lower bezel region 83 is located at the bottom of the display region 81. The first threshold adjustment bus line 711 is disposed in both the upper bezel region 82 and the lower bezel region 83, which is equivalent to providing a voltage from two ends of the first gate isolation column 31, facilitating an improvement in the uniformity of a voltage signal received by pixel driving units. Similarly, the second threshold adjustment bus line 712 and the third threshold adjustment bus line 713 are each disposed in both the upper bezel region 82 and the lower bezel region 83.

In another embodiment of the present application, the first threshold adjustment bus line 711 is disposed only in the upper bezel region 82; or the first threshold adjustment bus line 711 is disposed only in the lower bezel region 83. The second threshold adjustment bus line 712 is disposed only in the upper bezel region 82; or the second threshold adjustment bus line 712 is disposed only in the lower bezel region 83. The third threshold adjustment bus line 713 is disposed only in the upper bezel region 82; or the third threshold adjustment bus line 713 is disposed only in the lower bezel region 83.

In an embodiment of the present application, the first threshold adjustment bus line 711, the second threshold adjustment bus line 712, and the third threshold adjustment bus line 713 are all disposed in the isolation layer.

In another embodiment of the present application, the display panel further includes a first gate connection line, a second gate connection line, and a third gate connection line. The first gate connection line is disposed in the first metal layer 11 in the display region 81, the first threshold adjustment gate 111 is coupled to the first gate connection line, and the first gate connection line is parallel to the first gate isolation column 31; the second gate connection line is disposed in the first metal layer 11 in the display region 81, the second threshold adjustment gate 211 is coupled to the second gate connection line, and the second gate connection line is parallel to the at least one second gate isolation column 312; and the third gate connection line is disposed in the first metal layer 11 in the display region 81, the third threshold adjustment gate 311 is coupled to the third gate connection line, and the third gate connection line is parallel to the at least one third gate isolation column 313. Since a metal of the first metal layer 11 is thinner and an isolation column in the isolation layer has a larger thickness, the at least one first gate isolation column 31, the at least one second gate isolation column 312, and the at least one third gate isolation column 313 each have a smaller impedance. The first threshold adjustment gate 111, the second threshold adjustment gate 211, and the third threshold adjustment gate 311 are electrically connected to the at least one first gate isolation column 31, the at least one second gate isolation column 312, and the at least one third gate isolation column 313, respectively so that better uniformity is achieved. In practical application, gate connection lines disposed in the first metal layer 11 are used as a supplement scheme so that the uniformity of the display panel can be further improved.

Still referring to FIG. 10, in an embodiment of the present application, the first threshold adjustment bus line 711, the second threshold adjustment bus line 712, and the third threshold adjustment bus line 713 are disposed from top to bottom in the upper bezel region 82, the at least one first gate isolation column 31 is connected to the first threshold adjustment bus line 711 through an overpass line, and the at least one second gate isolation column 312 is connected to the second threshold adjustment bus line 712 through an overpass line so that a short circuit between the first gate isolation column 31, the second threshold adjustment bus line 712, and the third threshold adjustment bus line 713 can be avoided, and a short circuit between the at least one second gate isolation column 312 and the third threshold adjustment bus line 713 can be avoided. The at least one third gate isolation column 313 is directly connected to the third threshold adjustment bus line 713. Such a setting helps to simplify the wiring. The threshold adjustment bus lines and the gate isolation columns are arranged in a similar manner in the lower bezel region 83. The details are not repeated.

Still referring to FIG. 10, in an embodiment of the present application, the first cathode bus line 721 is disposed in both the upper bezel region 82 and the lower bezel region 83. Such a setting is equivalent to providing a voltage from two ends of the first cathode isolation column 321, facilitating an improvement in the uniformity of a voltage signal received by the pixel driving units. Similarly, the second cathode bus line 722 and the third cathode bus 7 line 23 are each disposed in both the upper bezel region 82 and the lower bezel region 83.

In the preceding embodiments, a direct electrical connection between the drive transistor and the light-emitting element is used as an example and not to limit the present application. In other embodiments, for example, in a pixel driving circuit with a compensation function, a light emission control transistor is provided between the drive transistor and the light-emitting element. Any form of the pixel driving circuit provided with a threshold adjustment gate and having the threshold adjustment gate connected to a gate isolation column is within the scope of the present application.

Figure 11:
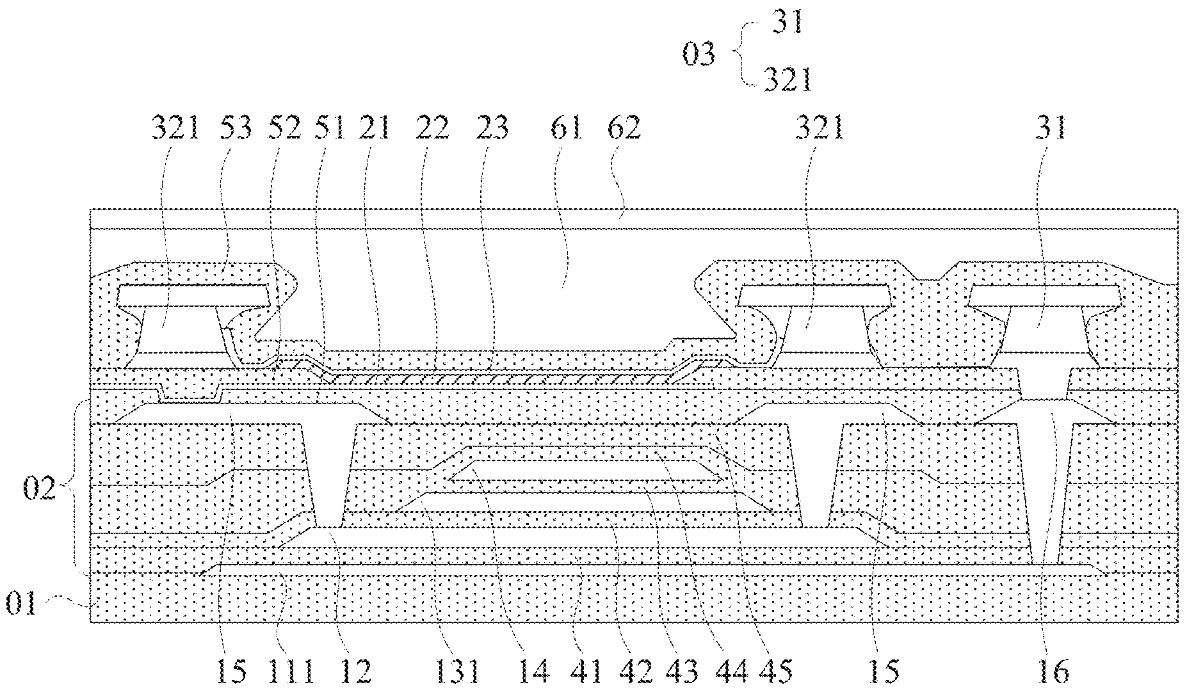
FIG. 11 is another sectional view of a display panel according to an embodiment of the present application.

FIG. 11 is another sectional view of a display panel according to an embodiment of the present application. Referring to FIG. 11, in another embodiment of the present application, the first gate isolation column 31 includes at least two sub-films, the width of an upper sub-film is greater than the width of a lower sub-film, and the at least two sub-films are made of different materials. For example, the techniques of exposure+development+etching are performed multiple times so that the first gate isolation column 31 shown in FIG. 12 may be formed. The at least one first cathode isolation column 321, the at least one second gate isolation column 312, the at least one third gate isolation column 313, the at least one second cathode isolation column 322, and the at least one third cathode isolation column 323 are arranged in the same manner and prepared by the same technique as the first gate isolation column 31. The details are not repeated.

Still referring to FIG. 11, in an embodiment of the present application, the overpass connection line 16 is further disposed in the fourth metal layer, the overpass connection line 16 is connected to the first threshold adjustment gate 111 through a via, and the first gate isolation column 31 is connected to the overpass connection line 16 through a via. Such a setting helps to simplify an etching technique of the display panel. When the fourth metal layer is prepared, a via to the semiconductor 12 in the active layer needs to be formed by the etching technique to prepare the source/drain electrode 15. At the same time, the via corresponding to the overpass connection line 16 may be etched to the first threshold adjustment gate 111 in the first metal layer 11. The overpass connection line 16 may be prepared in the same technique as the source/drain electrode 15. Before the first gate isolation column 31 is prepared, the via may be formed at a position corresponding to the overpass connection line 16 and on the seventh insulating layer 52 (that is, the pixel defining layer) and the sixth insulating layer 51 (that is, a planarization layer) through a photolithography technique, and then the first gate isolation column 31 is formed, so as to form a structure in which the first gate isolation column 31 is connected to the overpass connection line 16 through the via. The at least one second gate isolation column 312 and the at least one third gate isolation column 313 are arranged in the same manner and prepared by the same technique as the first gate isolation column 31. The details are not repeated.

In another embodiment of the present application, the first gate isolation column 31 is directly connected to the first threshold adjustment gate 111 through a via. For example, before the first gate isolation column 31 is prepared, a relatively deep via is formed at a position of the first threshold adjustment gate 111 by a deep hole etching technique, and then the first gate isolation column 31 is formed. The formed first gate isolation column 31 is directly connected to the first threshold adjustment gate 111 through the via. The at least one second gate isolation column 312 and the at least one third gate isolation column 313 are arranged in the same manner and prepared by the same technique as the first gate isolation column 31. The details are not repeated.

It can be seen that, as shown in FIG. 11, a connection to the first threshold adjustment gate 111 through the overpass connection line 16 requires no deep hole and is easier to implement in technique.

Embodiments of the present application further provide a display panel. Referring to FIG. 8, the display panel includes a substrate 01, a driver circuit layer 02, and an isolation layer 03.

The substrate 01 has a first side. The driver circuit layer 02 is disposed on the first side of the substrate 01 and includes a first drive transistor 110 in a first pixel driving unit 100, and the first drive transistor 110 has a first threshold adjustment gate 111. The isolation layer 03 is disposed on a side of the driver circuit layer 02 away from the substrate 01 and includes a first gate isolation column 31, the first gate isolation column 31 is coupled to the first threshold adjustment gate 111, and a first adjustment signal R_BSM is exerted to the first gate isolation column 31.

In the embodiments of the present application, it is set that the first drive transistor 110 in the first pixel driving unit 100 includes the first threshold adjustment gate 111, the first threshold adjustment gate 111 is coupled to the first gate isolation column 31 in the isolation layer 03, and the first adjustment signal R_BSM is exerted to the first gate isolation column 31 so that a voltage of the first threshold adjustment gate 111 of the first drive transistor 110 can be adjusted, thereby adjusting a threshold voltage of the first drive transistor 110 and improving the performance of the display panel.

In an embodiment, the driver circuit layer 02 further includes a second drive transistor 210 in a second pixel driving unit 200, and the second drive transistor 210 has a second threshold adjustment gate 211; and the isolation layer 03 further includes a second gate isolation column 312, the second gate isolation column 312 is coupled to the second threshold adjustment gate 211, and a second adjustment signal G_BSM is exerted to the second gate isolation column 312. For an arrangement manner of the second drive transistor 210, reference may be made to an arrangement manner of the first drive transistor 110, and for an arrangement manner of the second gate isolation column 312, reference may be made to an arrangement manner of the first gate isolation column 31. The details are not repeated.

Still referring to FIG. 8, the display panel may further include a light-emitting device layer 04, the light-emitting device layer 04 is disposed on the side of the driver circuit layer 02 away from the substrate 01, the light-emitting device layer 04 includes a first light-emitting element 120 in the first pixel driving unit 100 and a second light-emitting element 220 in the second pixel driving unit 200, the first light-emitting element 120 is coupled to the first drive transistor 110, and the second light-emitting element 220 is coupled to the second drive transistor 210, where the first light-emitting element 120 and the second light-emitting element 220 have different light emitting colors, and when the first light-emitting element 120 and the second light-emitting element 220 perform at a target grayscale, the first adjustment signal R_BSM and the second adjustment signal G_BSM have different voltage values. As described above, such a setting can reduce the power consumption of the display panel and further improve the performance of the display panel.

In an embodiment, the driver circuit layer 02 further includes a third drive transistor 310 in a third pixel driving unit 300, and the third drive transistor 310 has a third threshold adjustment gate 311; and the isolation layer 03 further includes a third gate isolation column 313, the third gate isolation column 313 is coupled to the third threshold adjustment gate 311, and a third adjustment signal B_BSM is exerted to the third gate isolation column 313. In this manner, threshold voltages in the first pixel driving unit 100, the second pixel driving unit 200, and the third pixel driving unit 300 can be adjusted separately, and voltage differences between the first light-emitting element 120, the second light-emitting element 220, and the third light-emitting element 320 can be compensated for, thereby balancing the efficiency of the first pixel driving unit 100, the second pixel driving unit 200, and the third pixel driving unit 300 and improving the uniformity and performance of the display panel.

In an embodiment, the light-emitting device layer 04 further includes a third light-emitting element 320 in the third pixel driving unit 300, and the third light-emitting element 320 is coupled to the third drive transistor 310, where the first light-emitting element 120, the second light-emitting element 220, and the third light-emitting element 320 have different light emitting colors, and when the first light-emitting element 120, the second light-emitting element 220, and the third light-emitting element 320 perform at the target grayscale, at least two of the first adjustment signal R_BSM, the second adjustment signal G_BSM, and the third adjustment signal B_BSM have different voltage values. In this manner, voltage adjustment for pixel driving units is performed more flexibly, further improving the performance of the display panel.

In an embodiment, when the first light-emitting element 120, the second light-emitting element 220, and the third light-emitting element 320 perform at the target grayscale, voltage values of the first adjustment signal R_BSM, the second adjustment signal G_BSM, and the third adjustment signal B_BSM are different from each other. In this manner, the first adjustment signal R_BSM, the second adjustment signal G_BSM, and the third adjustment signal B_BSM adapt to their corresponding pixel driving units, respectively.

Still referring to FIG. 8, in an embodiment, the isolation layer 03 further includes a first cathode isolation column 321, the display panel further includes the light-emitting device layer 04 disposed on the side of the driver circuit layer 02 away from the substrate 01, the light-emitting device layer 04 includes the first light-emitting element 120 in the first pixel driving unit 100, the first light-emitting element 120 is coupled to the first drive transistor 110, the first light-emitting element 120 has a first cathode 23, the first cathode 23 is coupled to the first cathode isolation column 321, and a first cathode signal R_ELVSS is exerted to the first cathode isolation column 321. The first cathode isolation column 321 can isolate the first cathode 23 of the first light-emitting element 120 from other cathodes so that the first cathode 23 of the first light-emitting element 120 can be separately provided with the first cathode signal R_ELVSS. In this manner, a voltage difference between the first light-emitting element 120 and another light-emitting element can be compensated for, thereby balancing the efficiency of the first pixel driving unit 100 and another pixel driving unit and improving the uniformity of the display panel.

Still referring to FIGS. 8 and 9, in an embodiment, the first cathode isolation column 321 has a first opening 321A, and part of the first light-emitting element 120 is disposed within the first opening 321A. In this manner, the first light-emitting element 120 can be surrounded by the first cathode isolation column 321, thereby achieving cathode isolation.

Still referring to FIG. 9, the first gate isolation column 31 and the at least one first cathode isolation column 321 are spaced apart in a second direction Y parallel to the substrate 01, and in the second direction Y, the first gate isolation column 31 has a first width d1, and the first cathode isolation column 321 has a second width d2, where the first width d1 is smaller than the second width d2. The first adjustment signal R_BSM required by the first drive transistor 110 is transmitted on the first gate isolation column 31, and the first cathode signal R_ELVSS is transmitted on the at least one first cathode isolation column 321. Therefore, the at least one first cathode isolation column 321 needs to withstand a large current. By contrast, the first gate isolation column 31 withstands a very small current. As a result, the first gate isolation column 31 may have a smaller width, thereby facilitating the wiring of the display panel and increasing a pixel density without affecting an aperture ratio of pixels.

Still referring to FIG. 9, the first cathode isolation column 321 may include a first structure 3211 and a second structure 3212 that are connected to each other, where the first structure 3211 surrounds the first opening 321A, the second structure 3212 extends in a first direction X, the first direction X and the second direction Y have an included angle, and the second structure 3212 has the second width d2. Such a setting facilitates the connection of first pixel driving units 100 in the first direction X by the first cathode isolation column 321 and makes the first cathode isolation column 321 have a larger dimension which facilitates the transmission of a large current.

In an embodiment, the first direction X is perpendicular to the second direction Y, facilitating a layout design of the display panel. A plane where the first direction X and the second direction Y are located is parallel to a plane where the substrate 01 is located.

Still referring to FIG. 9, the driver circuit layer 02 may further include the second drive transistor 210 in the second pixel driving unit 200, and the isolation layer 03 may further include the second gate isolation column 312, where the second drive transistor 210 has the second threshold adjustment gate 211, the second gate isolation column 312 is coupled to the second threshold adjustment gate 211, the second adjustment signal G_BSM is exerted to the second gate isolation column 312, and in the second direction Y parallel to the substrate 01, the first gate isolation column 31 is disposed between the first cathode isolation column 321 and the second gate isolation column 312. In this manner, the first gate isolation column 31 is adjacent to the first drive transistor 110, facilitating a decrease in a wiring distance and optimizing a wiring design.

Still referring to FIG. 9, the light-emitting device layer 04 may further include the second light-emitting element 220 in the second pixel driving unit 200, the second light-emitting element 220 is coupled to the second drive transistor 210, and the isolation layer 03 further includes a second cathode isolation column 322, where the second light-emitting element 220 has a second cathode, the second cathode is coupled to the second cathode isolation column 322, a second cathode signal G_ELVSS is exerted to the second cathode, and in the second direction Y parallel to the substrate 01, the second gate isolation column 312 is disposed between the first gate isolation column 31 and the second cathode isolation column 322. In this manner, the second gate isolation column 312 is adjacent to the second drive transistor 210, facilitating a decrease in the wiring distance and optimizing the wiring design.

The first gate isolation column 31 and the second gate isolation column 312 are disposed, as a whole, between the first cathode isolation column 321 and the second cathode isolation column 322, and their wiring shape adapts to a pixel arrangement manner. For example, their wiring is serpentine so that the occupation of a pixel opening can be minimized.

In an embodiment, the second cathode isolation column 322 has a second opening, and part of the second light-emitting element 220 is disposed within the second opening. In this manner, the second light-emitting element 220 can be surrounded by the second cathode isolation column 322, thereby achieving cathode isolation.

Still referring to FIG. 9, the light-emitting device layer 04 may further include the third light-emitting element 320 in the third pixel driving unit 300, and the isolation layer 03 further includes a third cathode isolation column 323, where the third light-emitting element 320 has a third cathode, the third cathode is coupled to the third cathode isolation column 323, a third cathode signal B_ELVSS is exerted to the third cathode isolation column 323, and in the second direction Y parallel to the substrate 01, the second cathode isolation column 322 is disposed between the second gate isolation column 312 and the third cathode isolation column 323.

In an embodiment, the third cathode isolation column 323 has a third opening, and part of the third light-emitting element 320 is disposed within the third opening. In this manner, the third light-emitting element 320 can be surrounded by the third cathode isolation column 323, thereby achieving cathode isolation.

Still referring to FIG. 9, the driver circuit layer 02 may further include the third drive transistor 310 in the third pixel driving unit 300, the third drive transistor 310 is coupled to the third light-emitting element 320, and the isolation layer 03 further includes the third gate isolation column 313, the third drive transistor 310 has the third threshold adjustment gate 311, the third gate isolation column 313 is coupled to the third threshold adjustment gate 311, the third adjustment signal B_BSM is exerted to the third gate isolation column 313, and in the second direction Y parallel to the substrate 01, the third cathode isolation column 323 is disposed between the second cathode isolation column 322 and the third gate isolation column 313. In this manner, the third gate isolation column 313 is adjacent to the third drive transistor 310, facilitating a decrease in the wiring distance and optimizing the wiring design.

Still referring to FIG. 9, the first cathode isolation column 321, the first gate isolation column 31, the second gate isolation column 312, the second cathode isolation column 322, the third cathode isolation column 323, and the third gate isolation column 313 are arranged in sequence along the second direction Y, which are arranged sequentially and cyclically.

For example, referring to FIG. 9, in some embodiments, the third cathode isolation column 323 includes a third structure (not shown) and a fourth structure (not shown) that are connected to each other, where the third structure of the third cathode isolation column 323 surrounds the third opening, and the fourth structure of the third cathode isolation column 323 extends in the first direction X. The fourth structure of the third cathode isolation column 323 has a third width d3, and the maximum width of the third structure of the third cathode isolation column 323 is equal to the third width d3.

Figure 12:
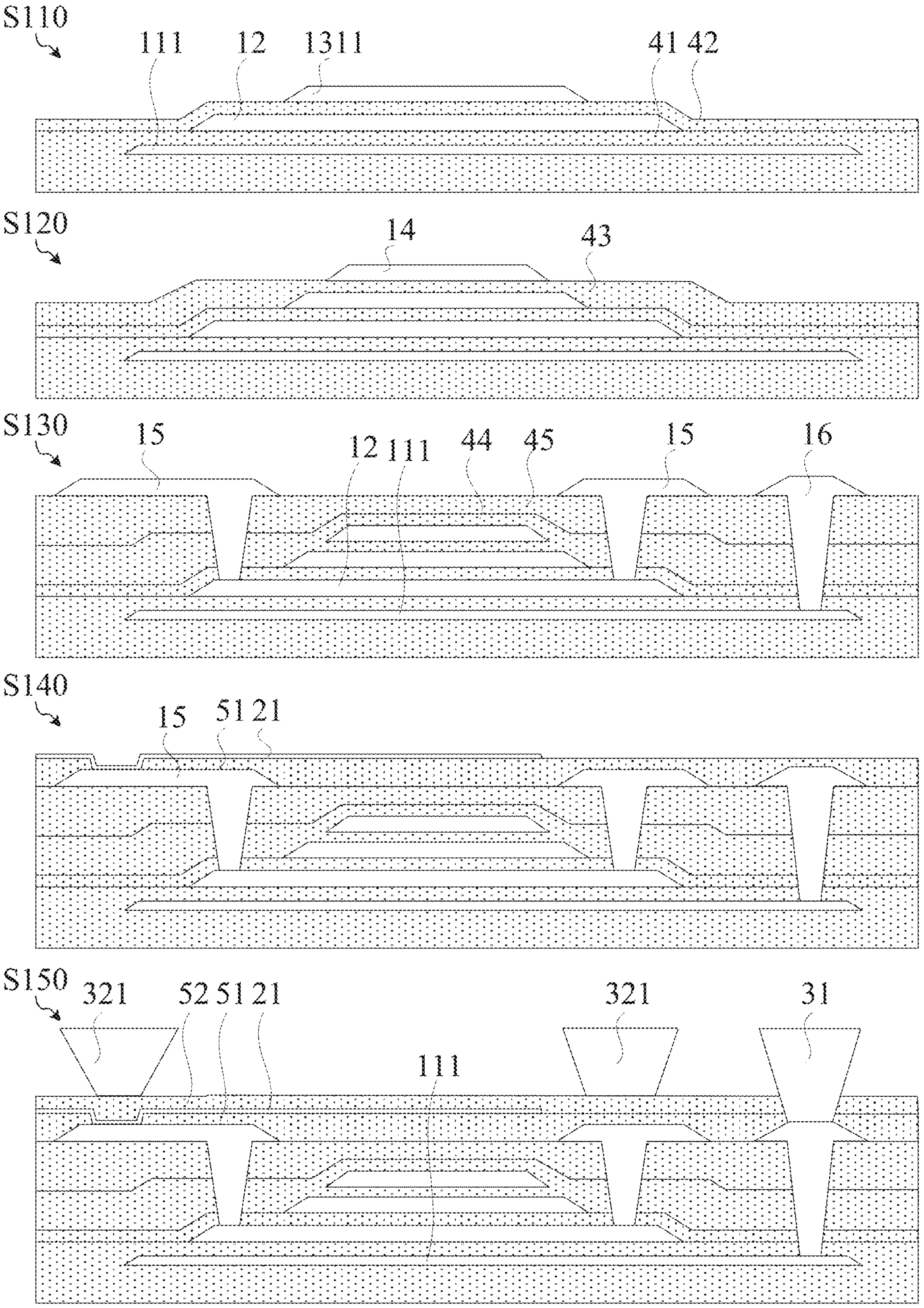
FIG. 12 is a structure diagram of a display panel formed in some steps of a preparation method for a display panel according to an embodiment of the present application.
Figure 13:
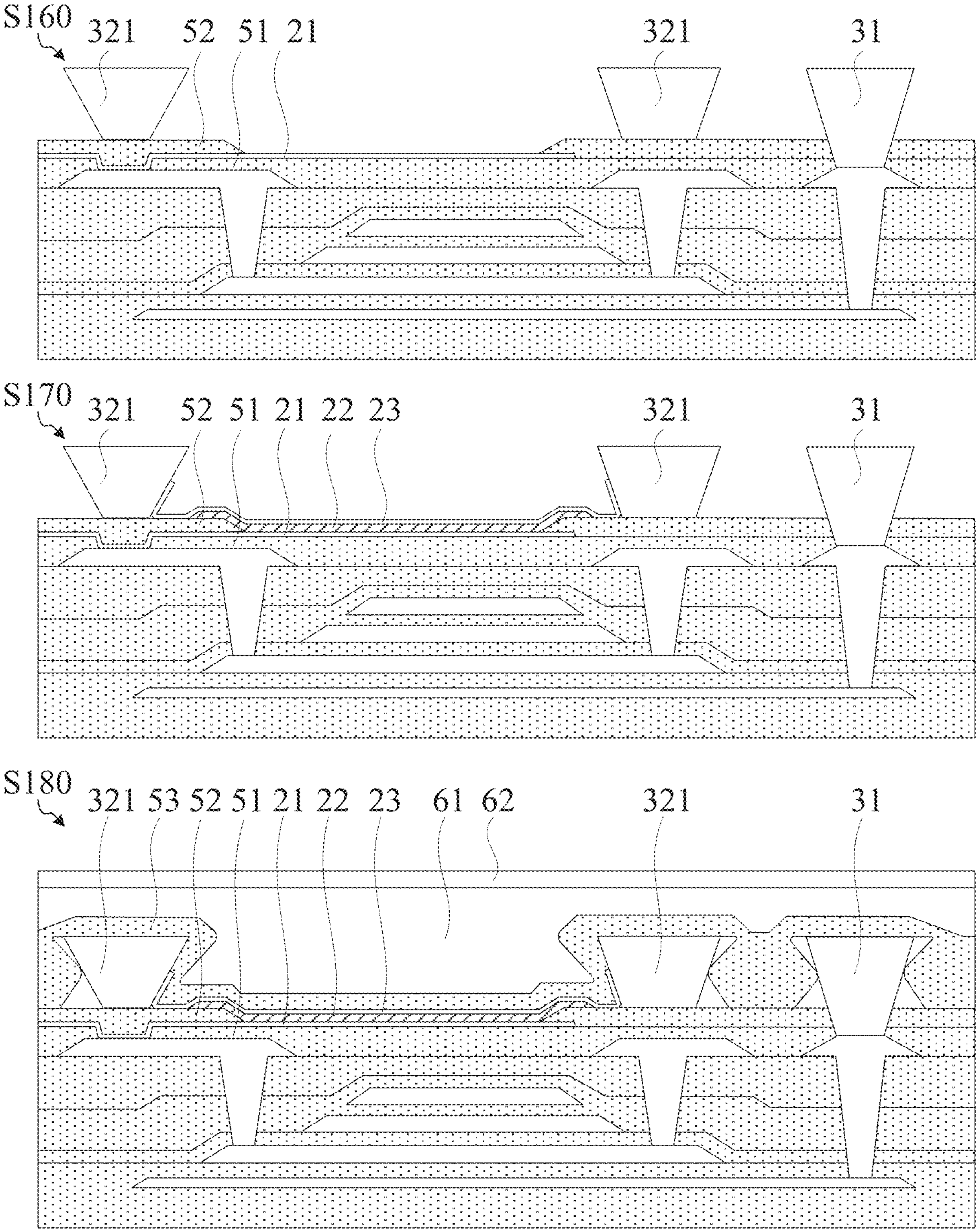
FIG. 13 is a structure diagram of a display panel formed in some other steps of a preparation method for a display panel according to an embodiment of the present application.

Embodiments of the present application further provide a preparation method for a display panel. The preparation method is applicable to the display panel according to any embodiment of the present application and has corresponding effects. FIG. 12 is a structure diagram of a display panel formed in some steps of a preparation method for a display panel according to an embodiment of the present application. FIG. 13 is a structure diagram of a display panel formed in some other steps of a preparation method for a display panel according to an embodiment of the present application. Referring to FIGS. 12 and 13, the preparation method for a display panel includes the steps below.

In S110, a first metal layer 11, a first insulating layer 41, an active layer, a second insulating layer 42, and a second metal layer are formed in sequence.

Each of the first insulating layer 41 and the second insulating layer 42 may be made of an inorganic material such as SiN and/or SiO and may be formed by a technique such as deposition. A first threshold adjustment gate 111 and a first drive current control gate 113 of a drive transistor are disposed in the first metal layer 11 and the second metal layer, respectively. A semiconductor 12 of the drive transistor is disposed in the active layer. Each of the first metal layer 11 and the second metal layer is made of a metal and may be formed by a technique such as sputtering or evaporation and then patterned to form the first drive current control gate 113 or the first threshold adjustment gate 111.

In S120, a third insulating layer 43 and a third metal layer are formed.

The third insulating layer 43 may be made of an inorganic material such as SiN and/or SiO and may be formed by a technique such as deposition. A capacitor plate 14 is disposed in the third metal layer. The third metal layer is made of a metal and may be formed by a technique such as sputtering or evaporation and then patterned to form the capacitor plate 14.

In S130, a fourth insulating layer 44 and a fourth metal layer are formed.

The fourth insulating layer 44 may be made of an inorganic material such as SiN and/or SiO and may be formed by a technique such as deposition. In an embodiment, after the fourth insulating layer 44 is formed, a fifth insulating layer 45 is formed on the fourth insulating layer 44. The fifth insulating layer 45 may be made of an organic material and can have a certain planarization function when isolating the third metal layer and the fourth metal layer.

After the fourth insulating layer 44 and the fifth insulating layer 45 are formed, a via is formed by techniques such as photoresist coating+exposure+development+etching. A source/drain electrode 15 of the drive transistor is disposed in the fourth metal layer. The fourth metal layer is made of a metal and may be formed by a technique such as sputtering or evaporation and then patterned to form the source/drain electrode 15. The source/drain electrode 15 is connected to the semiconductor 12 through the via.

In an embodiment, when the via corresponding to the source/drain electrode 15 is formed, a via corresponding to an overpass connection line 16 is also formed; and when the source/drain electrode 15 is formed through patterning, the overpass connection line 16 is also formed. In S140, a sixth insulating layer 51 and an anode metal layer are formed.

The sixth insulating layer 51 may be made of an organic material. When isolating the fourth metal layer from the anode metal layer, the sixth insulating layer 51 can make a surface of the fourth metal layer planarized, facilitating a flat film for the subsequent preparation of a light-emitting element and optimizing a luminescence effect of the light-emitting element.

After the sixth insulating layer 51 is formed, an anode opening is formed by techniques such as photoresist coating+exposure+development+etching. An anode 21 of the light-emitting element is disposed in the anode metal layer. The anode metal layer is made of a metal and may be formed by a technique such as sputtering or evaporation and then patterned to form the anode 21. The anode 21 is connected to the source/drain electrode 15 through the anode opening.

In S150, a seventh insulating layer 52 is formed, and an isolation layer 03 is formed on the seventh insulating layer 52.

The isolation layer 03 includes a first gate isolation column 31 tapered from top to bottom, and the first gate isolation column 31 is conductive. The first gate isolation column 31 is electrically connected to the first threshold adjustment gate 111 across films.

In an embodiment, the isolation layer 03 further includes a first cathode isolation column 321 tapered from top to bottom, and the first cathode isolation column 321 is conductive. The first gate isolation column 31 is tapered from top to bottom, and the first gate isolation column 31 and the first cathode isolation column 321 are prepared by the same technique.

In an embodiment, the first gate isolation column 31 is provided integrally, and the first cathode isolation column 321 is provided integrally. For example, the first gate isolation column 31 and the first cathode isolation column 321 that are tapered from top to bottom may be prepared by a lift-off technique. For example, a negative photoresist is coated, exposed, and developed to form openings at positions of the first gate isolation column 31 and the first cathode isolation column 321, metals are evaporated in the openings, and the remaining photoresist is removed to form the first gate isolation column 31 and the first cathode isolation column 321 that are tapered from top to bottom.

In S160, an opening is formed on the seventh insulating layer 52 to expose the anode 21.

For example, the opening through which the anode 21 is exposed is formed by techniques such as photoresist coating+exposure+development+etching, and the opening defines the size of a pixel opening.

In S170, a light-emitting function layer 22 and a cathode 23 of the light-emitting element are formed on the anode 21.

The light-emitting function layer 22 and the cathode 23 may each be evaporated as an entire layer. Light-emitting function layers 22 and cathodes 23 of adjacent light-emitting elements are disconnected by the first cathode isolation column 321, and the cathode 23 of the light-emitting element is connected to the first cathode isolation column 321.

For example, the light-emitting function layer 22 and a cathode layer 18 of red pixel driving units are each evaporated as an entire layer, and a red light-emitting function layer 22 and the cathode layer 18 are evaporated in each pixel opening. Since the first cathode isolation column 321 is tapered from top to bottom, a material evaporated into two adjacent pixel openings is disconnected by the first cathode isolation column 321, and an edge portion of the cathode 23 is electrically connected to the first cathode isolation column 321. The light-emitting function layer 22 and the cathode layer 18 outside red pixel openings are removed.

The light-emitting function layer 22 and the cathode layer 18 of green pixel driving units are each evaporated as an entire layer, and a green light-emitting function layer 22 and the cathode layer 18 are evaporated in each pixel opening. Since the red light-emitting function layer 22 and the cathode layer 18 have been evaporated in the red pixel openings, the green light-emitting function layer 22 and the cathode layer 18 are stacked on the red light-emitting function layer 22 and the cathode layer 18 in the red pixel openings. The green light-emitting function layer 22 and the cathode layer 18 outside green pixel openings are removed.

The light-emitting function layer 22 and the cathode layer 18 of blue pixel driving units are each evaporated as an entire layer, and a blue light-emitting function layer 22 and the cathode layer 18 are evaporated in each pixel opening. Since the red light-emitting function layer 22 and the cathode layer 18 have been evaporated in the red pixel openings and the green light-emitting function layer 22 and the cathode layer 18 have been evaporated in the green pixel openings, the blue light-emitting function layer 22 and the cathode layer 18 are stacked on the red light-emitting function layer 22 and the cathode layer 18 in the red pixel openings and the blue light-emitting function layer 22 and the cathode layer 18 are stacked on the green light-emitting function layer 22 and the cathode layer 18 in the green pixel openings. The blue light-emitting function layer 22 and the cathode layer 18 outside blue pixel openings are removed.

Thus, the red pixel driving units, the green pixel driving units, and the blue pixel driving units may be formed without using fine masks.

In S180, an eighth insulating layer 53, a sealing layer 61, and an encapsulation layer 62 are formed on the cathode 23.

In the embodiments of the display panel, preparation methods and techniques are described in detail for different structures of the display panel. These preparation methods and techniques may be considered as the preparation method for a display panel according to the embodiments of the present application. The repeated content is not described in detail here.

Embodiments of the present application further provide a display device. The display device may be a mobile phone, a computer, a tablet computer, a television, a wearable device, or the like. The display device includes the display panel according to any embodiment of the present application and has similar technical principles and achieved effects. The details are not repeated.

What is claimed is:

1. A pixel driving circuit, comprising:

at least one first pixel driving unit, pixel driving unit of the at least one first pixel driving unit comprising a first drive transistor and a first light-emitting element, the first drive transistor having a first drive current control gate and a first threshold adjustment gate, the first drive current control gate configured to receive a first data signal, the first threshold adjustment gate configured to receive a first adjustment signal, and the first drive transistor configured to drive the first light-emitting element under control of the first data signal and the first adjustment signal; and at least one second pixel driving unit, a second pixel driving unit of the at least one second pixel driving unit comprising a second drive transistor and a second light-emitting element, the second drive transistor having a second drive current control gate and a second threshold adjustment gate, the second drive current control gate configured to receive a second data signal, the second threshold adjustment gate configured to receive a second adjustment signal, and the second drive transistor configured to drive the second light-emitting element under control of the second data signal and the second adjustment signal; wherein the first light-emitting element and the second light-emitting element have different light emitting colors, and in a case where the first light-emitting element and the second light-emitting element perform at a target grayscale, the first adjustment signal and the second adjustment signal have different voltage values, the first threshold adjustment gate and the second threshold adjustment gate are respectively electrically connected to at least one first gate isolation column and at least one second gate isolation column, the first adjustment signal is applied to the at least one first gate isolation column, and the second adjustment signal is applied to the at least one second gate isolation column.

2. The pixel driving circuit according to claim 1, further comprising:

at least one third pixel driving unit, a third pixel driving unit of the at least one second pixel driving unit comprising a third drive transistor and a third light-emitting element, the third drive transistor having a third drive current control gate and a third threshold adjustment gate, the third drive current control gate configured to receive a third data signal, the third threshold adjustment gate configured to receive a third adjustment signal, and the third drive transistor configured to drive the third light-emitting element under control of the third data signal and the third adjustment signal;

wherein the first light-emitting element, the second light-emitting element, and the third light-emitting element have different light emitting colors, and in a case where the first light-emitting element, the second light-emitting element, and the third light-emitting element perform at the target grayscale, at least two of the first adjustment signal, the second adjustment signal, and the third adjustment signal have different voltage values.

3. The pixel driving circuit according to claim 2, wherein the target grayscale is a grayscale with a gray scale value of 0, and the first light-emitting element, the second light-emitting element, and the third light-emitting element emit no light at the grayscale with the gray scale value of 0.

4. The pixel driving circuit according to claim 3, wherein in the case where the first light-emitting element, the second light-emitting element, and the third light-emitting element perform at the target grayscale, the first data signal, the second data signal, and the third data signal have a same voltage value.

5. The pixel driving circuit according to claim 1, wherein the first light-emitting element has a first cathode, a first cathode signal is applied to the first cathode, the second light-emitting element has a second cathode, a second cathode signal is applied to the second cathode, and the first cathode signal and the second cathode signal have different voltage values.

6. The pixel driving circuit according to claim 5, further comprising at least one third pixel driving unit, a third pixel driving unit of the at least one third pixel driving unit comprising a third light-emitting element, wherein the first light-emitting element, the second light-emitting element, and the third light-emitting element have different light emitting colors, the third light-emitting element has a third cathode, and a third cathode signal is applied to the third cathode;

at least two of the first cathode signal, the second cathode signal, and the third cathode signal have different voltage values.

7. The pixel driving circuit according to claim 1, wherein black state voltages of the at least one first pixel driving unit and the at least one second pixel driving unit are configured to be consistent by different voltage values of the first adjustment signal and the second adjustment signal.

8. The pixel driving circuit according to claim 1, wherein the first threshold adjustment gate and the second threshold adjustment gate are electrically isolated from each other and disposed in a first metal layer.

9. A display panel, comprising:

a pixel driving circuit, comprising:

at least one first pixel driving unit, a first pixel driving unit of the at least one first pixel driving unit comprising a first drive transistor and a first light-emitting element, the first drive transistor having a first drive current control gate and a first threshold adjustment gate, the first drive current control gate configured to receive a first data signal, the first threshold adjustment gate configured to receive a first adjustment signal, and the first drive transistor configured to drive the first light-emitting element under control of the first data signal and the first adjustment signal; and at least one second pixel driving unit, a second pixel driving unit of the at least one second pixel driving unit comprising a second drive transistor and a second light-emitting element, the second drive transistor having a second drive current control gate and a second threshold adjustment gate, the second drive current control gate configured to receive a second data signal, the second threshold adjustment gate configured to receive a second adjustment signal, and the second drive transistor configured to drive the second light-emitting element under control of the second data signal and the second adjustment signal;

wherein the first light-emitting element and the second light-emitting element have different light emitting colors, and in a case where the first light-emitting element and the second light-emitting element perform at a target grayscale, the first adjustment signal and the second adjustment signal have different voltage values;

a first metal layer, a light-emitting function layer, and an isolation layer;

the first threshold adjustment gate and the second threshold adjustment gate electrically isolated from each other and disposed in the first metal layer;

the light-emitting function layer disposed on a side of the first metal layer, and part of the first light-emitting element and part of the second light-emitting element disposed in the light-emitting function layer; and the isolation layer disposed on the side of the first metal layer and configured to isolate the first light-emitting element from the second light-emitting element, and the isolation layer comprising at least one first gate isolation column and at least one second gate isolation column;

wherein the at least one first gate isolation column is coupled to the first threshold adjustment gate, the first adjustment signal is applied to the at least one first gate isolation column, the at least one second gate isolation column is coupled to the second threshold adjustment gate, and the second adjustment signal is applied to the at least one second gate isolation column.

10. The display panel according to claim 9, wherein the pixel driving circuit further comprises at least one third pixel driving unit, a third pixel driving unit of the at least one third pixel driving unit comprises a third drive transistor and a third light-emitting element, the third drive transistor has a third drive current control gate and a third threshold adjustment gate, the third drive current control gate is configured to receive a third data signal, the third threshold adjustment gate is configured to receive a third adjustment signal, and the third drive transistor is configured to drive the third light-emitting element under control of the third data signal and the third adjustment signal; the third threshold adjustment gate is electrically isolated from the first threshold adjustment gate, the third threshold adjustment gate is electrically isolated from the second threshold adjustment gate, and the third threshold adjustment gate is disposed in the first metal layer;

part of the third light-emitting element is disposed in the light-emitting function layer; and the isolation layer is further configured to isolate the third light-emitting element from the first light-emitting element, the isolation layer is further configured to isolate the third light-emitting element from the second light-emitting element, the isolation layer further comprises at least one third gate isolation column, the at least one third gate isolation column is coupled to the third threshold adjustment gate, and the third adjustment signal is applied to the at least one third gate isolation column.

11. The display panel according to claim 10, wherein the at least one first pixel driving unit comprises a plurality of first pixel driving units, the at least one second pixel driving unit comprises a plurality of second pixel driving units, and the at least one third pixel driving unit comprises a plurality of third pixel driving units;

first threshold adjustment gates of the plurality of first pixel driving units are coupled by a same one of the at least one first gate isolation column, second threshold adjustment gates of the plurality of second pixel driving units are coupled by a same one of the at least one second gate isolation column, and third threshold adjustment gates of the plurality of third pixel driving units are coupled by a same one of the at least one third gate isolation column; the plurality of first pixel driving units are arranged in a plurality of columns, the plurality of second pixel driving units are arranged in a plurality of columns, and the plurality of third pixel driving units are arranged in a plurality of columns; first threshold adjustment gates of first pixel driving units in a same column are coupled by a same one of the at least one first gate isolation column, second threshold adjustment gates of second pixel driving units in a same column are coupled by a same one of the at least one second gate isolation column, and third threshold adjustment gates of third pixel driving units in a same column are coupled by a same one of the at least one third gate isolation column.

12. The display panel according to claim 9, further comprising a cathode layer disposed on a side of the light-emitting function layer away from the first metal layer, the isolation layer further comprising at least one first cathode isolation column and at least one second cathode isolation column;

wherein the first light-emitting element has a first cathode, the second light-emitting element has a second cathode, and the first cathode and the second cathode are electrically isolated from each other and are disposed in the cathode layer;

the at least one first cathode isolation column is coupled to the first cathode, a first cathode signal is applied to the at least one first cathode isolation column, the second cathode isolation column is coupled to the second cathode, and a second cathode signal is applied to the second cathode isolation column;

the first cathode signal and the second cathode signal have different voltage values;

the pixel driving circuit further comprises at least one third pixel driving unit, and a third pixel driving unit of the at least one third pixel driving unit comprises a third light-emitting element;

the isolation layer further comprises at least one third cathode isolation column, the third light-emitting element has a third cathode, the third cathode is disposed in the cathode layer, the third cathode is electrically isolated from the first cathode, the third cathode is electrically isolated from the second cathode, the at least one third cathode isolation column is coupled to the third cathode, and a third cathode signal is applied to the at least one third cathode isolation column; and at least two of the first cathode signal, the second cathode signal, and the third cathode signal have different voltage values.

13. The display panel according to claim 12, wherein the at least one first pixel driving unit comprises a plurality of first pixel driving units, the at least one second pixel driving unit comprises a plurality of second pixel driving units, and the at least one third pixel driving unit comprises a plurality of third pixel driving units;

first cathodes of the plurality of first pixel driving units are coupled by a same one of the at least one first cathode isolation column, second cathodes of the plurality of second pixel driving units are coupled by a same one of the at least one second cathode isolation column, and third cathodes of the plurality of third pixel driving units are coupled by a same one of the at least one third cathode isolation column;

the plurality of first pixel driving units are arranged in a plurality of columns, the plurality of second pixel driving units are arranged in a plurality of columns, and the plurality of third pixel driving units are arranged in a plurality of columns; first cathodes of first pixel driving units in a same column are coupled by a same one of the at least one first cathode isolation column, second cathodes of second pixel driving units in a same column are coupled by a same one of the at least one second cathode isolation column, and third cathodes of third pixel driving units in a same column are coupled by a same one of the at least one third cathode isolation column.

14. The display panel according to claim 9, wherein the at least one first pixel driving unit comprises a plurality of first pixel driving units, and the at least one second pixel driving unit comprises a plurality of second pixel driving units;

first threshold adjustment gates of the plurality of first pixel driving units are coupled by a same one of the at least one first gate isolation column, and second threshold adjustment gates of the plurality of second pixel driving units are coupled by a same one of the at least one second gate isolation column;

the isolation layer further comprises at least one first cathode isolation column and at least one second cathode isolation column, the first light-emitting element has a first cathode, the second light-emitting element has a second cathode, first cathodes of the plurality of first pixel driving units are coupled by a same one of the at least one first cathode isolation column, and second cathodes of the plurality of second pixel driving units are coupled by a same one of the at least one second cathode isolation column.

15. The display panel according to claim 9, wherein the display panel has a display region and a bezel region adjacent to each other, the pixel driving circuit is disposed in the display region, and the display panel comprises:

a first threshold adjustment bus line disposed in the bezel region, and the at least one first gate isolation column coupled to the first threshold adjustment bus line; and a second threshold adjustment bus line disposed in the bezel region, and the at least one second gate isolation column coupled to the second threshold adjustment bus line;

the pixel driving circuit further comprises at least one third pixel driving unit, a third pixel driving unit of the at least one third pixel driving unit comprises a third drive transistor and a third light-emitting element, wherein the third drive transistor has a third drive current control gate and a third threshold adjustment gate, the third drive current control gate is configured to receive a third data signal, the third threshold adjustment gate is configured to receive a third adjustment signal, and the third drive transistor is configured to drive the third light-emitting element under control of the third data signal and the third adjustment signal;

the isolation layer further comprises at least one third gate isolation column, the at least one third gate isolation column is coupled to the third threshold adjustment gate, and the third adjustment signal is applied to the at least one third gate isolation column; and the display panel further comprises a third threshold adjustment bus line disposed in the bezel region, and the at least one third gate isolation column is coupled to the third threshold adjustment bus line.

16. The display panel according to claim 15, wherein the at least one first pixel driving unit comprises a plurality of first pixel driving units, the at least one second pixel driving unit comprises a plurality of second pixel driving units, and the at least one third pixel driving unit comprises a plurality of third pixel driving units; and the plurality of first pixel driving units are arranged in a plurality of columns, the plurality of second pixel driving units are arranged in a plurality of columns, the plurality of third pixel driving units are arranged in a plurality of columns, columns of the plurality of first pixel driving units, the plurality of second pixel driving units and the plurality of third pixel driving units extend along a first direction, and the first threshold adjustment bus line, the second threshold adjustment bus line, and the third threshold adjustment bus line extend along a second direction, respectively;

the first direction and the second direction have an included angle.

17. The display panel according to claim 16, wherein the isolation layer further comprises at least one first cathode isolation column, at least one second cathode isolation column, and at least one third cathode isolation column; and the display panel further comprises:

a cathode layer disposed on a side of the light-emitting function layer away from the first metal layer, the first light-emitting element having a first cathode, the second light-emitting element having a second cathode, the third light-emitting element having a third cathode, the first cathode, the second cathode, and the third cathode electrically isolated from each other and disposed in the cathode layer, the at least one first cathode isolation column coupled to the first cathode, the at least one second cathode isolation column coupled to the second cathode, and the at least one third cathode isolation column coupled to the third cathode;

a first cathode bus line disposed in the bezel region, and the at least one first cathode isolation column coupled to the first cathode bus line;

a second cathode bus line disposed in the bezel region, and the at least one second cathode isolation column coupled to the second cathode bus line; and a third cathode bus line disposed in the bezel region, and the at least one third cathode isolation column coupled to the third cathode bus line;

wherein the first cathode bus, the second cathode bus line, and the third cathode bus line extend along the second direction.

18. A display panel, comprising:

a substrate with a first side;

a driver circuit layer disposed on the first side and comprising at least a first drive transistor in a first pixel driving unit, and the first drive transistor having a first threshold adjustment gate; and an isolation layer disposed on a side of the driver circuit layer away from the substrate and comprising at least a first gate isolation column, the first gate isolation column coupled to the first threshold adjustment gate, and a first adjustment signal is applied to the first gate isolation column.

19. The display panel according to claim 18, wherein the driver circuit layer further comprises a second drive transistor in a second pixel driving unit, and the second drive transistor has a second threshold adjustment gate;

the isolation layer further comprises a second gate isolation column, the second gate isolation column is coupled to the second threshold adjustment gate, and a second adjustment signal is applied to the second gate isolation column;

the display panel further comprises a light-emitting device layer, the light-emitting device layer is disposed on the side of the driver circuit layer away from the substrate, the light-emitting device layer comprises a first light-emitting element in the first pixel driving unit and a second light-emitting element in the second pixel driving unit, the first light-emitting element is coupled to the first drive transistor, and the second light-emitting element is coupled to the second drive transistor;

the first light-emitting element and the second light-emitting element have different light emitting colors, and in a case where the first light-emitting element and the second light-emitting element perform at a target grayscale, the first adjustment signal and the second adjustment signal have different voltage values;

the driver circuit layer further comprises a third drive transistor in a third pixel driving unit, and the third drive transistor has a third threshold adjustment gate;

the isolation layer further comprises a third gate isolation column, the third gate isolation column is coupled to the third threshold adjustment gate, and a third adjustment signal is applied to the third gate isolation column;

the light-emitting device layer further comprises a third light-emitting element in the third pixel driving unit, and the third light-emitting element is coupled to the third drive transistor;

the first light-emitting element, the second light-emitting element, and the third light-emitting element have different light emitting colors, and in a case where the first light-emitting element, the second light-emitting element, and the third light-emitting element perform at the target grayscale, at least two of the first adjustment signal, the second adjustment signal, and the third adjustment signal have different voltage values.

20. The display panel according to claim 18, wherein the isolation layer further comprises at least one first cathode isolation column;

the display panel further comprises:

a light-emitting device layer disposed on the side of the driver circuit layer away from the substrate and comprising a first light-emitting element in the first pixel driving unit, the first light-emitting element coupled to the first drive transistor, the first light-emitting element having a first cathode, the first cathode coupled to the first cathode isolation column, and a first cathode signal is applied to the first cathode isolation column;

the first cathode isolation column has a first opening, and part of the first light-emitting element is disposed within the first opening;

the first gate isolation column and the first cathode isolation column are spaced apart in a second direction parallel to the substrate, and in the second direction, the first gate isolation column has a first width, the first cathode isolation column has a second width, and the first width is smaller than the second width; and the first cathode isolation column comprises a first structure and a second structure that are connected to each other, the first structure surrounds the first opening, the second structure extends in a first direction, the first direction and the second direction have an included angle, and the second structure has the second width.

21. The display panel according to claim 20, wherein the driver circuit layer further comprises a second drive transistor in a second pixel driving unit, and the isolation layer further comprises a second gate isolation column; the second drive transistor has a second threshold adjustment gate, the second gate isolation column is coupled to the second threshold adjustment gate, a second adjustment signal is applied to the second gate isolation column, and in the second direction parallel to the substrate, the first gate isolation column is disposed between the first cathode isolation column and the second gate isolation column;

the light-emitting device layer further comprises a second light-emitting element in the second pixel driving unit, the second light-emitting element is coupled to the second drive transistor, the isolation layer further comprises a second cathode isolation column, the second light-emitting element has a second cathode, the second cathode is coupled to the second cathode isolation column, a second cathode signal is applied to the second cathode isolation column, and in the second direction parallel to the substrate, the second gate isolation column is disposed between the first gate isolation column and the second cathode isolation column; and the second cathode isolation column has a second opening, and part of the second light-emitting element is disposed within the second opening.

22. The display panel according to claim 21, wherein the light-emitting device layer further comprises a third light-emitting element in a third pixel driving unit, and the isolation layer further comprises a third cathode isolation column;

the third light-emitting element has a third cathode, the third cathode is coupled to the third cathode isolation column, a third cathode signal is applied to the third cathode isolation column, and in the second direction parallel to the substrate, the second cathode isolation column is disposed between the second gate isolation column and the third cathode isolation column;

the third cathode isolation column has a third opening, and part of the third light-emitting element is disposed within the third opening; and the driver circuit layer further comprises a third drive transistor in the third pixel driving unit, the third drive transistor is coupled to the third light-emitting element, and the isolation layer further comprises a third gate isolation column; the third drive transistor has a third threshold adjustment gate, the third gate isolation column is coupled to the third threshold adjustment gate, a third adjustment signal is applied to the third gate isolation column, and in the second direction parallel to the substrate, the third cathode isolation column is disposed between the second cathode isolation column and the third gate isolation column.

* * * * *